(12) United States Patent
El-Shennawy et al.

(10) Patent No.: US 12,140,486 B1
(45) Date of Patent: Nov. 12, 2024

(54) INDUCTIVE ANGLE SENSOR AND INDUCTIVE TORQUE SENSOR

(71) Applicant: Melexis Technologies SA, Bevaix (CH)

(72) Inventors: Mohammed El-Shennawy, Dresden (DE); Soumil Kumar, Dresden (DE); Yassine Akermi, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 18/780,642

(22) Filed: Jul. 23, 2024

(30) Foreign Application Priority Data

Aug. 9, 2023 (EP) .................................. 23190710

(51) Int. Cl.
*G01L 3/10* (2006.01)
*G01B 7/30* (2006.01)
*G01D 5/20* (2006.01)

(52) U.S. Cl.
CPC ............... *G01L 3/105* (2013.01); *G01B 7/30* (2013.01); *G01D 5/20* (2013.01)

(58) Field of Classification Search
CPC ............ G01L 3/105; G01B 7/30; G01D 5/20
See application file for complete search history.

(56) References Cited

U.S. PATENT DOCUMENTS

| | | | | |
|---|---|---|---|---|
| 4,659,989 A | * | 4/1987 | Kerr | G01V 3/107 324/225 |
| 10,837,848 B2 | * | 11/2020 | Janisch | G01D 5/2053 |
| 11,525,716 B2 | * | 12/2022 | El-Shennawy | G01D 18/001 |
| 11,614,344 B1 | * | 3/2023 | Sachse | G01D 5/2448 324/207.12 |
| 11,692,887 B2 | * | 7/2023 | Witts | G01L 3/105 73/862.331 |
| 11,994,387 B2 | * | 5/2024 | Rasbornig | G01D 5/2046 |
| 12,013,300 B2 | * | 6/2024 | Witts | G01L 5/221 |
| 2010/0319467 A1 | | 12/2010 | Diekmann et al. | |
| 2020/0200569 A1 | * | 6/2020 | Utermoehlen | G01D 5/204 |
| 2021/0302207 A1 | * | 9/2021 | Lugani | G01D 5/2073 |
| 2022/0065664 A1 | * | 3/2022 | Hristov | H03K 17/9505 |

FOREIGN PATENT DOCUMENTS

| | | |
|---|---|---|
| EP | 3792599 A1 | 3/2021 |
| EP | 3988903 A1 | 4/2022 |
| EP | 4198458 A1 | 6/2023 |
| WO | 2022132229 A1 | 6/2022 |

OTHER PUBLICATIONS

Extended European Search Report from corresponding EP Application No. 23190710.6, Dec. 5, 2023.

* cited by examiner

*Primary Examiner* — Octavia Hollington
(74) *Attorney, Agent, or Firm* — Workman Nydegger

(57) ABSTRACT

An Inductive angle sensor comprising: a number of inductively coupled transmitter coils together forming an inductively coupled transmitter coil system; a number of receiver coil sets; a number of integrated devices each having a first and a second oscillator pin, each integrated device having an excitation circuit for providing an alternating signal over its oscillator pins, and having an evaluation circuit for evaluating signals obtained from a set of receiver coils; at least one movable target arranged in the vicinity of the receiver coils; wherein each transmitter coil has a first end connected to a first oscillator pin of a first integrated device and has a second end (TX1*b*) connected to a second oscillator pin of a subsequent integrated device.

15 Claims, 12 Drawing Sheets

INDUCTIVE ANGLE SENSOR AND INDUCTIVE TORQUE SENSOR

FIELD OF THE INVENTION

The present invention relates in general to the field of inductive angle sensors and inductive torque sensors, and more specifically to an inductive angle sensor and an inductive torque sensor with at least some fault-tolerance.

BACKGROUND OF THE INVENTION

Inductive angle sensors are known in the art. They offer the advantage of being able to measure an angular position without making physical contact, thus avoiding problems of mechanical wear, scratches, friction, etc. They typically comprise an excitation coil (also known as "transmitter coil") and multiple detection coils (also known as "receiver coils") and a coupling element. The excitation coil generates an alternating magnetic field, which is coupled to a set of receiver coils depending on an angular position of the coupling element. Signals obtained from the receiver coils are processed in an electronics circuit, and an angular position is determined based on these signals.

EP4198458 (A1) describes an inductive angle sensor.

US2010319467 (A1) discloses an inductive torque sensor.

It is important that an angle sensor or a torque sensor functions correctly, especially in automotive applications, robotic applications, and industrial applications for the safety of personnel or users or operators, and in order to limit material damage. Several degrees of "safety" are known in the art, such as (i) being able to detect an error, but not being able to continue operation if an error is detected; or (ii) being able to detect an error, but continue to function correctly despite the error, albeit possibly with a reduced performance (e.g. reduced speed, reduced accuracy, increased power consumption, etc.), or (iii) being able to detect the error and correct the error and continue the operation as defined.

There is always room for improvements or alternatives.

SUMMARY OF THE INVENTION

It is an object of embodiments of the present invention to provide an inductive angle sensor, and/or an inductive torque sensor comprising such an angle sensor, with at least some fault-tolerance.

It is an object of embodiments of the present invention to provide an inductive angle sensor and/or an inductive torque sensor with at least some redundancy, e.g. by providing two integrated devices and two transmitter coils.

It is an object of embodiments of the present invention to provide an inductive angle sensor and/or an inductive torque sensor which is fault-tolerant to a variety of errors, (sometimes also referred to as "fail-operational"), e.g. related to a soldering error between some of its components, e.g. related to an unwanted short circuit between two nodes, or related to an unwanted open-circuit between two nodes, or related to a missing or damaged component (e.g. a missing SMD component, e.g. a missing capacitor, or a missing resistor).

It is an object of embodiments of the present invention to provide an inductive angle sensor and/or an inductive torque sensor which is fault-tolerant to (at least) a short circuit between the two oscillator pins (e.g. LCP1, LCN1) of an integrated device used therein, even if the two oscillator pins of the integrated devices used therein are neighbouring pins, and preferably also to other errors.

It is an object of embodiments of the present invention to provide an inductive angle sensor and/or an inductive torque sensor without increasing the number of pins of the integrated devices used therein, and/or without having to re-layout the semiconductor substrates of the integrated devices used therein.

It is an object of embodiments of the present invention to provide an inductive sensor and/or torque sensor that is suitable for use in an automotive, robotic or industrial environment.

These objectives are accomplished by embodiments of the present invention.

According to a first aspect, the present invention provides an inductive angle sensor comprising: a first transmitter coil (e.g. TX1); a second transmitter coil (e.g. TX2) inductively coupled to the first transmitter coil (e.g. TX1), the first and the second transmitter coil together forming an inductively coupled transmitter coil system; a first set of receiver coils (e.g. RX1a, RX1b, RX1c) comprising at least two or at least three receiver coils; a second set of receiver coils (e.g. Rx2a, RX2b, RX2c) comprising at least two or at least three receiver coils; a first integrated device (e.g. IC1) having a first oscillator pin (e.g. LCP1) and a second oscillator pin (e.g. LCN1), and having an excitation circuit for providing an alternating signal over its oscillator pins (e.g. LCP1, LCN1); and having a plurality of receiver pins connected to the first set of receiver coils (e.g. RX1a, RX1b, RX1c), and an evaluation circuit for evaluating signals obtained from the first set of receiver coils; a second integrated device (e.g. IC2) having a first oscillator pin (e.g. LCP2) and a second oscillator pin (e.g. LCN2), and having an excitation circuit for providing an alternating signal over its oscillator pins (e.g. LCP2, LCN2); and having a plurality of receiver pins connected to the second set of receiver coils (e.g. RX2a, RX2b, RX2c), and an evaluation circuit for evaluating signals obtained from the second set of receiver coils; at least one movable target for providing an inductive coupling between the inductively coupled transmitter coil system and each set of receiver coils; wherein the first transmitter coil (e.g. TX1) has a first end (e.g. TX1a) operatively connected to the first oscillator pin (e.g. LCP1) of the first integrated device (e.g. IC1), and has a second end (e.g. TX1b) operatively connected to the second oscillator pin (e.g. LCN2) of the second integrated device (e.g. IC2); and the second transmitter coil (e.g. TX2) has a first end (e.g. TX2a) operatively connected to the first oscillator pin (e.g. LCP2) of the second integrated device (e.g. IC2), and has a second end (e.g. TX2b) operatively connected to the second oscillator pin (e.g. LCN1) of the first integrated device (e.g. IC1).

An example of such an inductive angle sensor is illustrated in FIG. 6A, in combination with FIG. 4A or FIG. 4B.

It is an advantage of providing two integrated circuits (IC's), two transmitter coils and two sets of receiver coils, because in this way hardware redundancy is provided, which allows to detect an error.

It is an advantage of the inductively coupled and further cross-coupling the transmitter coils between the two IC's (as opposed to connecting them between 2 oscillator pins of a single IC), because such an arrangement is more robust against certain hardware failures, such as for example:

i) robust against a "short circuit connection" between the first and the second pin of the first integrated device (e.g. as illustrated in FIG. 6B). This is particularly relevant if these oscillator pins are adjacent pins of an integrated device and more specifically adjacent pins of a packaged semiconductor device (also referred to as "chip");

ii) robust against a disconnection between an oscillator pin (e.g. LCP1) and a transmitter coil (e.g. TX1), e.g. as illustrated in FIG. 6C.

It is an advantage that this solution does not require device packages with an increased number of pins (e.g. with an extra pin between the two oscillator pins to decrease the risk of such a short circuit).

In an embodiment, the transmitter coils and the receiver coils are integrated on a single multi-layer printed circuit board (PCB), e.g. a four-layer PCB, or a six-layer PCB.

It is an advantage of the present invention that the inductive angle sensor is tolerant against a variety of possible faults, such as: (i) a short circuit between the two oscillator pins of a chip (see e.g. FIG. 6B and FIG. 7B), (ii) a disconnect between an oscillator pin of a chip and a transmitter coil (see e.g. FIG. 6C and FIG. 7C).

In an embodiment, the first integrated device (e.g. IC1) is a first packaged semiconductor device having a plurality of pins, and wherein the first oscillator pin (e.g. LCP1) and the second oscillator pin (e.g. LCN1) of the first integrated device are adjacent pins of the first packaged semiconductor device; and wherein the second integrated device (e.g. IC2) is a second packaged semiconductor device having a plurality of pins, and wherein the first oscillator pin (e.g. LCP2) and the second oscillator pin (e.g. LCN2) of the second integrated device are adjacent pins of the second packaged semiconductor device.

In other words, in this embodiment, the first and second oscillator pins are located next to each other, without any intermediate pin.

Preferably the inductance of the second transmitter coil is substantially equal to the inductance of the first transmitter coil.

In an embodiment, each of the first and second transmitter coil (e.g. TX1, TX2) has an inductance in the range from 3.0 to 5.0 µH.

The coupling factor or coupling coefficient (k) between the first and second transmitter coil is preferably a value in the range from 0.5 to 1.0, or in the range from 0.6 to 1.0, or in the range from 0.7 to 1.0, or in the range from 0.8 to 1.0, or in the range from 0.9 to 1.0.

In an embodiment, the inductive angle sensor further comprises a first capacitor (e.g. C1p) having a first end connected to the first oscillator pin (e.g. LCP1) of the first integrated device (e.g. IC1) and a second end connected to a first reference voltage; and further comprises a second capacitor (e.g. C1n) having a first end connected to the second oscillator pin (e.g. LCN1) of the first integrated device (e.g. IC1) and a second end connected to a second reference voltage; and further comprises a third capacitor (e.g. C2p) having a first end connected to the first oscillator pin (e.g. LCP2) of the second integrated device (e.g. IC2) and a second end connected to a third reference voltage; and further comprises a fourth capacitor (e.g. C2n) having a first end connected to the second oscillator pin (e.g. LCN2) of the second integrated device (e.g. IC2) and a second end connected to a fourth reference voltage.

In an embodiment, the first, second, third and fourth reference voltage are equal, e.g. formed by a ground plane of a printed circuit board, but that is not absolutely required, and the second end may also be connected to another stable voltage, e.g. VDD.

The first TX coil TX1 and the capacitors C1p and C2n connected thereto form a first LC oscillator having a first resonance frequency. The second TX coil TX2 and the capacitors C2p and C1n connected thereto form a second LC oscillator, having a second resonance frequency. Preferably the first resonance frequency and the second resonance frequency are the same, but the invention will still work if a ratio of the first resonance frequency and the second resonance frequency is a value in the range from 0.90 to 1.10, or from 0.95 to 1.05, for example.

In an embodiment, each of the first and second integrated device (e.g. IC1, IC2) further comprises an internal current limiting mechanism to limit a current that is allowed to flow into or out of the integrated device via the first and second oscillator pins.

Such a circuit is particularly useful in case of a short circuit of a capacitor.

In an embodiment, the first evaluation circuit is configured for determining a first angular value (e.g. α1) based on the signals obtained from the first set of receiver coils (e.g. RX1a, RX1b, RX1c); and the second evaluation circuit is configured for determining a second angular value (e.g. α2) based on the signals obtained from the second set of receiver coils (e.g. Rx2a, RX2b, RX2c).

Depending on the application, the first angle and the second angle may be used, for example, for determining an absolute angle value in a 360° range. In another application, the first angle and the second angle may be used, for example, for determining an elastic deformation of a torque bar, due to a torque that is being applied thereto.

In an embodiment, a central position (e.g. a middle) of the first transmitter coil (e.g. TX1) is electrically connected to a central position (e.g. a middle) of the second transmitter coil (e.g. TX2) via a short circuit (e.g. a copper track) or via a resistor.

Or stated in other words, in this embodiment, (e.g. illustrated in FIG. 8), a position near the middle of the first transmitter coil is electrically connected to a position near the middle of the second transmitter coil, by means of a resistor. The resistance of this resistor can be very small, e.g. smaller than 40 Ohm, or smaller than 20 Ohm, or smaller than 10 Ohm, or smaller than 5 Ohm, or smaller than 1.0 Ohm.

It is an advantage of this embodiment that it reduces or eliminates the risk of a non-oscillating state, or in other words, helps to achieve an oscillating state during start-up.

In an embodiment, the inductive angle sensor further comprises one or both of: a first resistor (e.g. R1) having a first end (e.g. R1a) connected to the first oscillator pin (e.g. LCP1) of the first integrated device (e.g. IC1) and having a second end (e.g. R1b) connected to the first oscillator pin (e.g. LCP2) of the second integrated device (e.g. IC2); a second resistor (e.g. R2) having a first end (e.g. R2a) connected to the second oscillator pin (e.g. LCN1) of the first integrated device (e.g. IC1) and having a second end (e.g. R2b) connected to the second oscillator pin (e.g. LCN2) of the second integrated device (e.g. IC2).

It is an advantage of adding cross-coupled resistors, because such an arrangement further improves the robustness against hardware failures, e.g. in case one end of the transmitter coil is not connected to the first or second oscillator pin of the integrated device, e.g. as illustrated in FIG. 7C to FIG. 7H.

Another advantage of adding cross-coupled resistors is that the risk of both LC oscillators being stuck in a stable state is reduced, and that a start-up leading to an oscillating state is easier reached.

It was found that one resistor is enough to avoid a non-oscillating state, but the use of two resistors offers better redundancy and offers a full symmetry of the circuit.

It is an advantage of this embodiment that the inductive angle sensor is furthermore tolerant against any of the following faults:

iii) a disconnect between an oscillator pin of a chip and a capacitor (see e.g. FIG. 7E),
iv) a short-circuit of the capacitor, or a short-circuit between an oscillator pin and ground, or a short-circuit between one end of a transmitter coil and ground (see e.g. FIG. 7F),
v) a short-circuit of the electrical resistor, or a short-circuit between LCP1 and LCP2, or a short circuit between LCN1 and LCN2 (see e.g. FIG. 7G),
vi) a disconnect between an oscillator pin and a resistor (see e.g. FIG. 7H).

In an embodiment, each of the first and second transmitter coil (e.g. TX1, TX2) has an inductance in the range from 3.0 to 5.0 pH, and the first and the second resistor (e.g. R1, R2) has a resistance in the range from 30 to 120 Ohm, and each of the capacitors (e.g. C1P, C1n, C2p, C2n) has a capacitance in the range from 0.5 nF to 2.0 nF.

In an embodiment, each of the first and the second integrated device is configured to perform a test to detect a presence or a short circuit of the first resistor (e.g. R1) based on an electrical resistance between the first oscillator pin (e.g. LCP1) of the first integrated device and the first oscillator pin (e.g. LCP2) of the second oscillator device; and/or wherein each of the first and the second integrated device is configured to perform a test to detect a presence of a short circuit of the second resistor (e.g. R2) based on an electrical resistance between the second oscillator pin (e.g. LCN1) of the first integrated device and the second oscillator pin (e.g. LCN2) of the second oscillator device.

This test may for example be performed during start-up of the integrated devices.

The test may comprise for example: applying a predefined voltage over said oscillator pins and measuring a current; or may comprise for example the measurement of a time constant when charging or discharging a capacitor through said resistor.

In an embodiment, each of the first and the second integrated device (e.g. IC1, IC2) is further configured to detect loss of oscillation over its first and second oscillator pin.

Loss of oscillation may for example be detected by comparing the frequency of the LC oscillator and another, e.g. an internal oscillator frequency, e.g. an RC oscillator frequency.

Optionally the integrated device is further configured for reporting this loss of oscillation, e.g. automatically after detecting it, or upon request, e.g. by an external device (e.g. an ECU), e.g. via a serial bus interface.

In an embodiment, the first and second integrated device (e.g. IC1, IC2) are further configured to determine a frequency value of an oscillation over its first and second oscillator pin; and is further configured to detect an error based on this frequency value.

For example, by testing whether the determined frequency value lies in a first predefined range (or above a first predefined threshold value) corresponding to a first mode of operation (e.g. "normal operation") or lies in a second predefined range (or below said first predefined threshold value) corresponding to a second mode of operation (e.g. "degraded accuracy mode but still operational").

Optionally the device is further configured for testing if the determined frequency is lower than a second threshold value, corresponding to a third mode of operation (e.g. "non-oscillating mode").

Optionally the integrated device is further configured for reporting this frequency value or this error, e.g. automatically after detecting it, or upon request, e.g. by an external device (e.g. an ECU), e.g. via a serial bus interface.

In an embodiment, the first set of receiver coils (e.g. RX1a, RX1b, RX1c) are mainly located on a first side of a multilayer printed circuit board (PCB), and the second set of receiver coils (e.g. RX2a, RX2b, RX2c) are mainly located on a second side of the multilayer printed circuit board (PCB), opposite the first side.

With "mainly located on a particular side" is meant for example that a major portion of the conductive tracks forming the coils is situated on that particular side, e.g. at least 60% or at least 70% or at least 80% of the total length of the tracks forming that coil, even if there are one or more vias and/or "bridges" formed in another layer of the multilayer PCB.

In an embodiment, the inductive angle sensor comprises a single movable target; and each of the first and second integrated device (e.g. IC1, IC2) is configured for determining an angular position (e.g. α1, α2) of the single movable target.

In this embodiment, a single movable target is sufficient, but in a variant, two movable targets which are movable in a same manner (e.g. interconnected by a short rigid axis portion), may also be used. In case two movable targets are used, they preferably have the same periodicity. A constant offset between them can be determined (e.g. during production) and can be compensated.

This inductive angle sensor is particularly suited in pedal angle measurement applications, because the same angle is measured twice. (stated in simple terms: single mechanical target, double electronics).

Both angle sensors may be configured to provide the determined angular position to an external processor (e.g. an ECU) which can detect an error by testing consistency between the first angle and the second angle. In this case, each of the first and second integrated device is communicatively connected to said ECU.

Alternatively or additionally, the first integrated device provides its angular position to the second integrated device, and the second integrated device is configured for detecting an error by testing consistency between the first angle and the second angle. In this case, the first and second integrated device are communicatively connected to each other.

In an embodiment, the first integrated device (e.g. IC1) is configured for determining a first angular value (e.g. α1) of the single movable target; and the second integrated device (e.g. IC2) is configured for determining a second angular value (e.g. α2) of the single movable target; and the inductive angle sensor is further configured for determining a consistency between the first angular value (e.g. α1) and the second angular value (e.g. α2).

This inductive angle sensor may also be referred to as "a redundant angle sensor".

The functionality of determining a consistency (or for detecting an error) may be implemented in the first integrated device, and/or in the second integrated device, and/or in a third device (e.g. an ECU) communicatively connected to the first and the second integrated device.

In an embodiment, the inductive angle sensor comprises a first movable target having a first periodicity (e.g. a first number of lobes), and a second movable target having a second periodicity (e.g. a second number of lobes) different from the first periodicity; and the first set of receiver coils has a periodicity equal to the first periodicity, and the second set of receiver coils has a periodicity equal to the second periodicity; and the first integrated device (e.g. IC1) is configured for determining a first angular position (e.g. α1) of the first movable target relative to the first set of receiver coils; and the second integrated device (e.g. IC2) is configured for determining a second angular position (e.g. α2) of the second movable target relative to the second set of receiver coils; and the inductive angle sensor is further configured for determining an absolute angular position based on the first angular value (e.g. α1) and the second angular value (e.g. α2).

This inductive angle sensor may also be referred to as "an absolute angular position sensor".

The functionality of determining said absolute position may be implemented in the first integrated device, and/or in the second integrated device, and/or in a third device (e.g. an ECU) communicatively connected to the first and the second integrated device.

In an embodiment, the inductive angle sensor further comprises an external processor (e.g. an ECU) communicatively connected to the first integrated device, and to the second integrated device.

According to a second aspect, the present invention also provides a torque sensor comprising: a torsion bar; an inductive angle sensor according to the first aspect, comprising a first movable target and a second movable target; wherein the first movable target is connected to the torsion bar at a first axial position, and the second movable target is connected to the torsion bar at a second axial position, spaced from the first axial position.

The torsion bar is elastically deformable.

The torque sensor can be seen as a special kind of inductive angle sensor, where two different angles are measured. Such a torque sensor can e.g. be used in steering wheel applications.

Preferably the PCB of the torque sensor comprises six layers, and the two TX coils are mainly located in the two central layers.

In an embodiment, the first integrated device (e.g. IC1) is configured for determining a first angular position (e.g. α1) of the first movable target relative to the first set of receiver coils (e.g. RX1a, RX1b, RX1c); and the second integrated device (e.g. IC2) is configured for determining a second angular position (e.g. α2) of the second movable target relative to the second set of receiver coils (e.g. RX2a, RX2b, RX2c); and the torque sensor is further configured for determining a difference between the first angular value (e.g. α1) and the second angular value (e.g. α2), and for providing this difference, or a value derived therefrom, as a value indicative of the torque to be measured.

The difference is indicative of a torque exerted upon the torsion bar.

According to a third aspect, the present invention also provides an Inductive angle sensor comprising: a number N of inductively coupled transmitter coils (e.g. TX1, TX2, TX3, TX4) together forming an inductively coupled transmitter coil system, N being at least three; a plurality (e.g. N) of receiver coil sets, each set of receiver coils comprising at least two or at least three receiver coils; said number N of integrated devices (e.g. IC1, IC2, IC3, IC4), each integrated device having a first and a second oscillator pin (e.g. LCP1, LCN1; LCP2, LCN2; LCP3, LCN3; LCP4, LCN4), and each integrated device having an excitation circuit for providing an alternating signal over its oscillator pins, and each integrated device having an evaluation circuit for evaluating signals obtained from one of the sets of receiver coils; at least one movable target for providing an inductive coupling between the inductively coupled transmitter coil system and the sets of receiver coils; wherein each transmitter coil (e.g. TX1, TX2, TX3, TX4) has a first end (e.g. TX1a) operatively connected to a first oscillator pin (e.g. LCP1) of a first integrated device (e.g. IC1, IC2, IC3, IC4), and has a second end (e.g. TX1b) operatively connected to a second oscillator pin (e.g. LCN2) of a subsequent integrated device (e.g. IC2, IC3, IC4, IC1).

In an embodiment, the inductive angle sensor further comprises one or both of: i) a number N of first electrical resistors (e.g. R1p, R2p, R3p, R4p) having a first end connected to a first oscillator pin (e.g. LCP1, LCP2, LCP3, LCP4) of a first integrated device (e.g. IC1, IC2, IC3, IC4) and having a second end connected to the first oscillator pin (e.g. LCP2, LCP3, LCP4, LCP1) of a subsequent integrated device (e.g. IC2, IC3, IC4, IC1); ii) a number N of second electrical resistors (e.g. R1n, R2n, R3n, R4n) having a first end connected to a second oscillator pin (e.g. LCN1, LCN2, LCN3, LCN4) of a first integrated device (e.g. IC1, IC2, IC3, IC4) and having a second end connected to the second oscillator pin (e.g. LCN4, LCN1, LCN2, LCN3) of a previous integrated device (e.g. IC4, IC1, IC2, IC3).

According to a fourth aspect, the present invention also provides a torque sensor comprising: a torsion bar; an inductive angle sensor according to the third aspect, comprising a first movable target and a second movable target; wherein the first movable target is connected to the torsion bar at a first axial position, and the second movable target is connected to the torsion bar at a second axial position, spaced from the first axial position.

In an embodiment, two integrated devices (e.g. IC1, IC2) are configured for determining a first angular position (e.g. α1) of the first movable target relative to a printed circuit board; and two integrated devices (e.g. IC3, IC4) are configured for determining a second angular position (e.g. α2) of the second movable target relative to the printed circuit board; and the torque sensor is further configured for determining a difference between the first angular value (e.g. α1) and the second angular value (e.g. α2), and for providing this difference, or a value derived therefrom, as a value indicative of the torque to be measured.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

Figure 1:
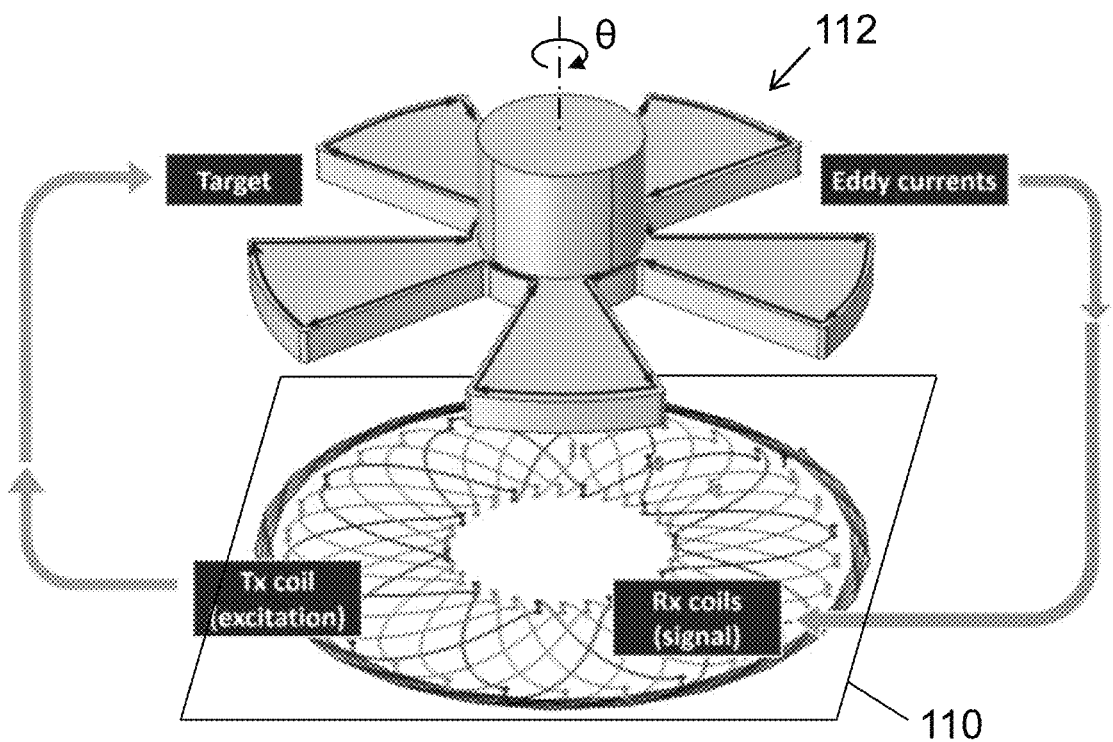
FIG. 1 shows an example of an inductive sensor arrangement, known in the art.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same or like reference signs (e.g. same modulo 100) typically refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the terms "excitation coil" and "transmitter coil" mean the same.

In this document, the terms "receiver coil" and "detection coil" mean the same.

In this document, the terms "coupling element" and "target" and "rotor" mean the same.

In this document, the "periodicity" of a movable target may refer to the number of lobes or teeth.

In this document, a "mechanical angle" of a movable target can be calculated as the "electrical angle" of the movable target divided by its periodicity.

In this document, "SMD component" stands for "Surface Mounted Device" component, e.g. an SMD capacitor or an SMD resistor.

In this document, when referring to "chip" or "sensor chip", reference is made to "integrated device", unless it is clear from the context that something else was meant.

The present invention is related to inductive angle sensors and/or inductive torque sensors with at least some fault-tolerance, meaning that the angle sensor or torque sensor will continue to function correctly (but maybe with a reduced accuracy) even in case of certain errors, such as e.g. soldering errors, a short circuit connection, a disconnection (open circuit), etc.

The inductive angle sensors proposed by the present invention can be used in various applications, such as e.g. a redundant angle sensor, an absolute position sensor, or a torque sensor.

Referring now to the figures.

FIG. 1 shows an example of an inductive sensor arrangement comprising: a substrate 110 (e.g. a printed circuit board, PCB) comprising a transmitter coil and a plurality of receiver coils; and a target 112 (e.g. a metal target) rotatable relative to said substrate. In the example shown in FIG. 1, the transmitter coil Tx has three circular windings, and the target 112 has five lobes (or leaves or blades) which are spaced apart by 360°/5=72°. The principles of operation of such an inductive sensor arrangement are well known in the art, and hence need not be explained in full detail here. It suffices to say that typically an integrated circuit (not shown in FIG. 1, but see e.g. FIG. 3) provides an excitation signal to a transmitter coil, which is layout on a printed circuit board (PCB). The transmitter coil is part of an LC oscillator circuit. The integrated circuit provides alternating signals to the transmitter coil, which induces eddy currents in an electrically conductive (e.g. metal) target 112, which in turn induces an alternating current in receiver coils depending on the angle or position of the target. The receiver coils are also layout on said PCB. The signals can be decoded by the integrated circuit to determine the angular position of the target.

Figure 2:
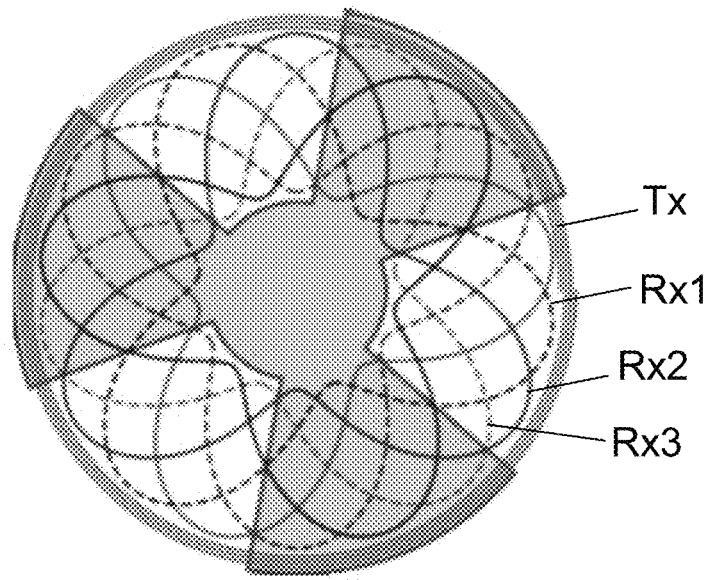
FIG. 2 shows a variant of the arrangement of FIG. 1 for a target having only three blades, known in the art.

FIG. 2 shows a variant of the arrangement of FIG. 1 for a target having only three blades.

Figure 3:
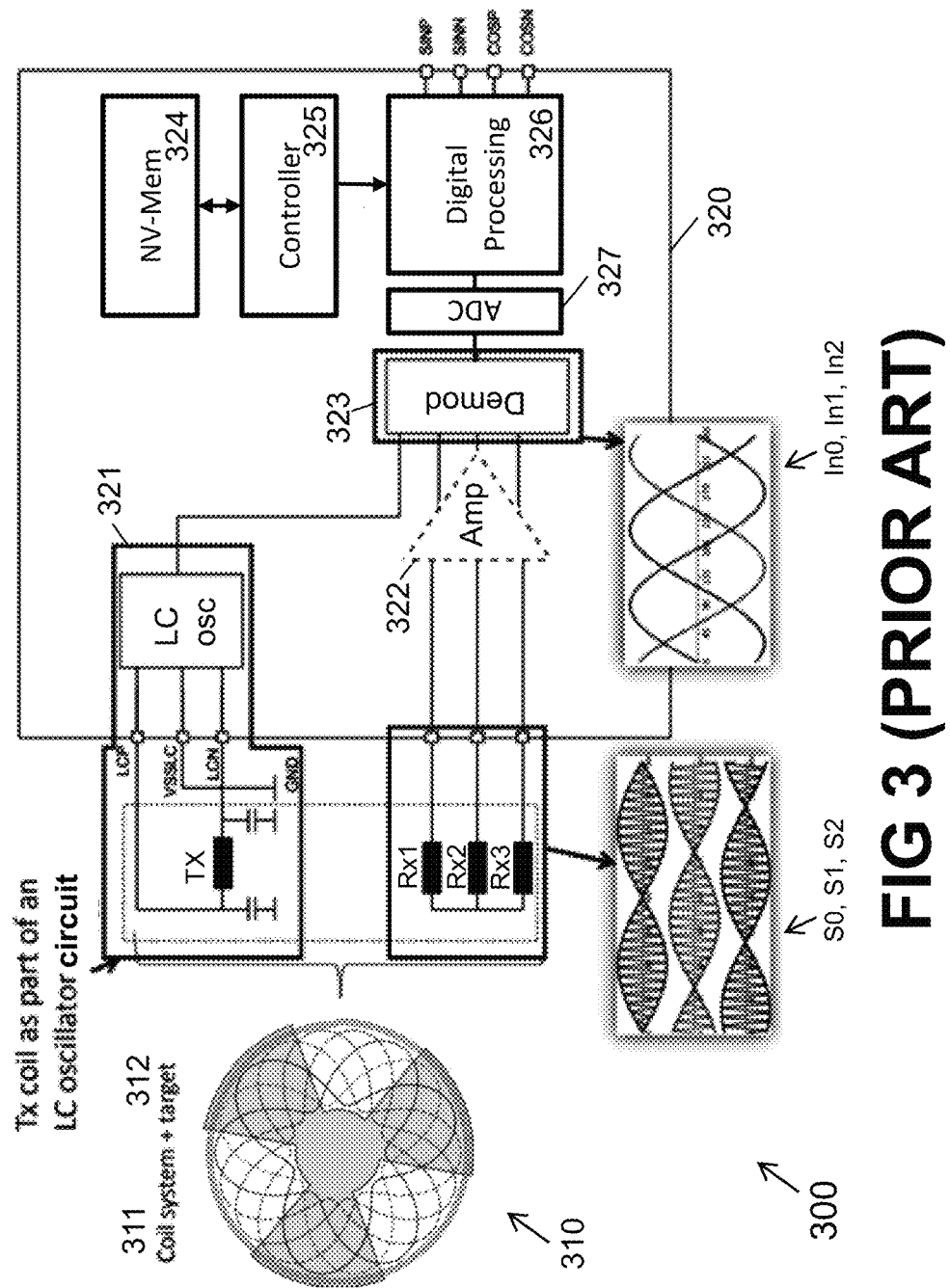
FIG. 3 shows a schematic block-diagram of an angular sensor system known in the art, that comprises a substrate with at least one transmitter coil and three receiver coils, a target movable relative to said substrate, and an integrated device connected to said receiver and transmitter coils.

FIG. 3 shows a schematic block-diagram of an angular sensor system 300 comprising: a substrate (e.g. a PCB) with one transmitter coil TX and three receiver coils Rx1, Rx2, Rx3, a target 312 movable relative to said substrate, and an integrated device 320 connected to said transmitter coil TX and to said receiver coils. The integrated circuit 320 may amplify the three received signals and may demodulate the envelopes from the carrier signal, producing three baseband signals, from which the angular position of the rotor can be derived.

FIG. 1 to FIG. 3 are known from EP4198458 (A1), and are provided here mainly as background information, and in order to illustrate potential problems of the prior art.

One such problem is that the angle sensor will no longer work in case the oscillator pins LCP and LCN of the integrated device 320 of FIG. 3 are inadvertently shorted. This risk has an increased probability in case the two oscillator pins LCP and LCN are neighbouring pins of the integrated device 320.

The inventors of the present invention were asked to provide a solution for this problem. More specifically, they were asked to provide an inductive angle sensor and/or an inductive torque sensor that will continue to work, even if the LCP and LCN pins of the integrated device are shorted. Preferably, of course, a cheap and/or compact solution is preferred.

A trivial solution is to completely duplicate the hardware, e.g. by providing twice the hardware of FIG. 3, i.e. two printed circuit boards (PCB's), each having a Transmitter coil, and a plurality of Receiver coils, and an integrated device, and a movable target, but this solution is not compact and not cheap, and a cheaper solution is desired.

Figure 4A:
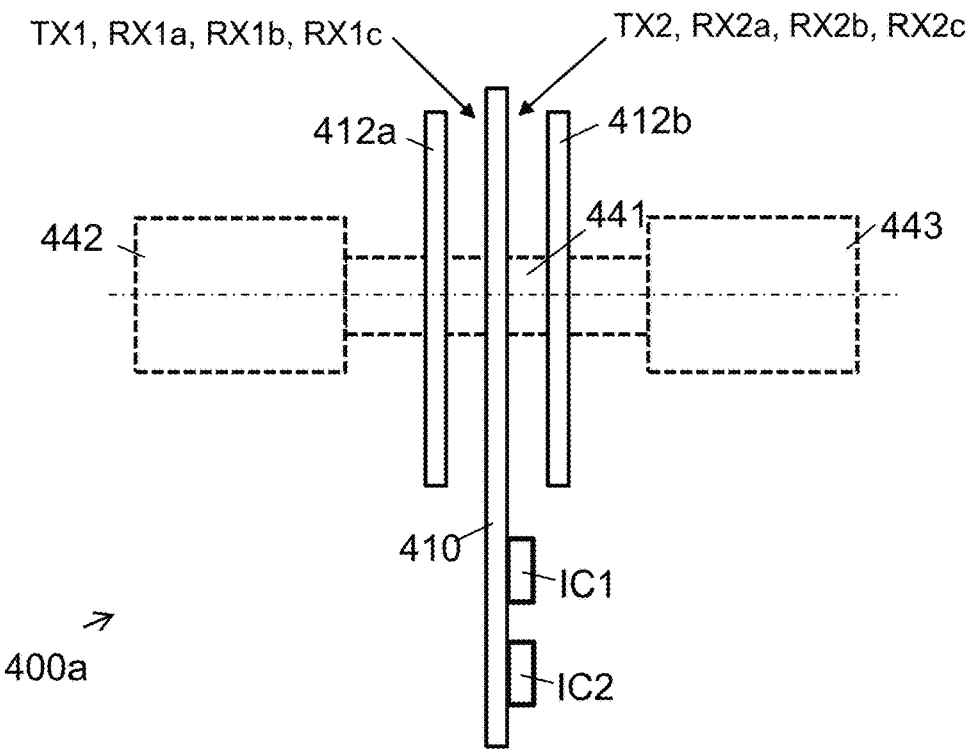
FIG. 4A shows a schematic representation of an inductive angle sensor arrangement according to embodiments of the present invention, as may be used for example in a torque sensor.

FIG. 4A shows a schematic representation of an inductive angle sensor system 400a proposed by the present invention, comprising a single PCB 410 and two movable targets 412a, 412b located on opposite sides of the PCB.

The first target 412a has a first periodicity (e.g. a first number of lobes), and the first set of receiver coils RX1a, RX1b, RX1c also has the first periodicity. The second target 412b has a second periodicity (e.g. a second number of lobes), and the second set of receiver coils RX2a, RX2b, RX2c also has the second periodicity. If the periodicity is N (e.g. N=5), the angular position of the target has a measurement range of 360°/N=72° mechanical.

The first periodicity is preferably different from the second periodicity. This offers the advantage of reducing crosstalk between the signals induced by the first target and the second target.

The PCB may be a four-layer PCB or a six-layer PCB, or may comprise more than six layers.

The PCB 410 comprises a first transmitter coil TX1, and a first set of receiver coils RX1a, RX1b, RX1c, and a first integrated device IC1; and a second transmitter coil TX2, and a second set of receiver coils RX2a, RX2b, RX2c, and a second integrated device IC2.

Preferably the two integrated devices IC1, IC2 are mounted on a same side of the PCB 410.

Figure 4B:
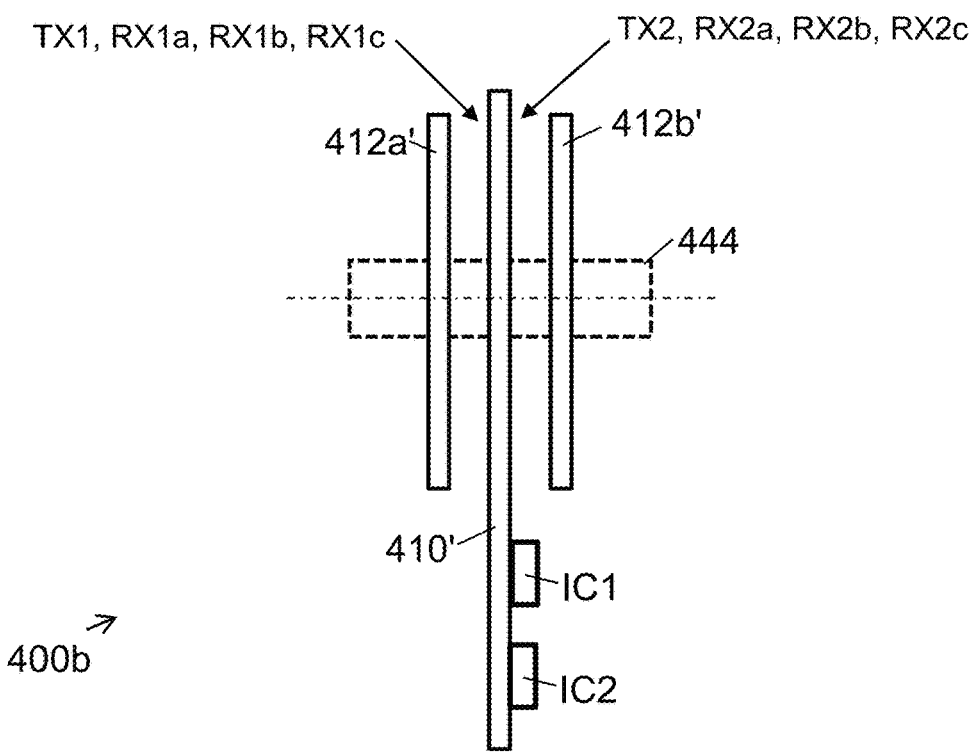
FIG. 4B shows a schematic representation of another inductive angle sensor arrangement according to embodiments of the present invention, as may be used for example in a redundant angle sensor or an absolute angle sensor.

Preferably, the first set of receiver coils RX1a, RX1b, RX1c are mainly located on a first side of the multilayer PCB (in the example of FIG. 4A mainly on the left side, closer to the target 412a)), and the second set of receiver coils RX2a, RX2b, RX2c are mainly located on a second side of the multilayer PCB, opposite the first side (in the example of FIG. 4B mainly on the right side, closer to the target 412b).

With "mainly located on a particular side" is meant for example that a major portion of the conductive tracks forming the coils is situated on that particular side, e.g. at least 60% or at least 70% or at least 80% of the total length of the tracks forming that coil, even if there are one or more vias and/or "bridges" formed in another layer of the multilayer PCB.

In an embodiment, the PCB 410 of the torque sensor comprises six layers, and the two TX coils are mainly located in the two central layers.

In the example of FIG. 4A, the first target 412a and the second target 412b are connected at two different axial positions of a torsion bar 441. The torsion bar is elastically deformable when a torque is exerted upon the torsion bar. The torsion bar 441 may be connected at one end to a first shaft 442 and may be connected at its other end to a second shaft 443. When a torque is exerted between the first shaft 442 and the second shaft 443, the target 412a will slightly move relative to the target 412b. This angular difference can be measured, and the torque can be derived as a function of this angular shift, e.g. by using a mathematical formula or a look-up table.

FIG. 4B shows another schematic representation of an inductive angle sensor system 400b proposed by the present invention, which can be seen as a variant of the system 400a of FIG. 4A. The main difference being that the first target 412a' and the second target 412b' are both connected to a rigid shaft 444 with a negligible deformation between the axial locations where the targets are connected. When a torque is applied to the shaft 444, the first target 412a' and the second target 412b' do not substantially rotate relative to each other.

In case the first periodicity (of the first target and the first set of receiver coils) is equal to the second periodicity (of the second target and the second set of receiver coils), the angle sensor of FIG. 4B can be used as a redundant inductive angle sensor, and both chips IC1 and IC2 will measure substantially the same angle of the targets and thus of the shaft relative to the PCB. It is noted that one of the movable targets 412a', 412b' may be omitted in this case.

In case the first periodicity is different from the second periodicity, e.g. one more or one less, the angle sensor of FIG. 4B can be used as an absolute angle sensor, e.g. by applying the nonius principle. By considering both angle values, a unique position of the shaft in a 360° measurement range can be determined.

FIG. 4A and FIG. 4B show possible mechanical arrangements of the targets and the PCB 410 that comprises the transmitter coils TX1, TX2 and the first set of receiver coils (RX1a, RX1b, RX1c) and the second set of receiver coils (RX2a, RX2b, RX2c), but the question of how to make the angle sensor fault-tolerant has not yet been addressed. This will be described next.

In the embodiments shown in FIG. 4A and FIG. 4B, IC1 is connected to a first set of 3 receiver coils RX1a, RX1b, RX1c and IC2 is connected to a second set of 3 receiver coils RX2a, RX2b, RX2c, but that is not absolutely required, and it is also possible to use only two receiver coils per set.

Figure 5A:
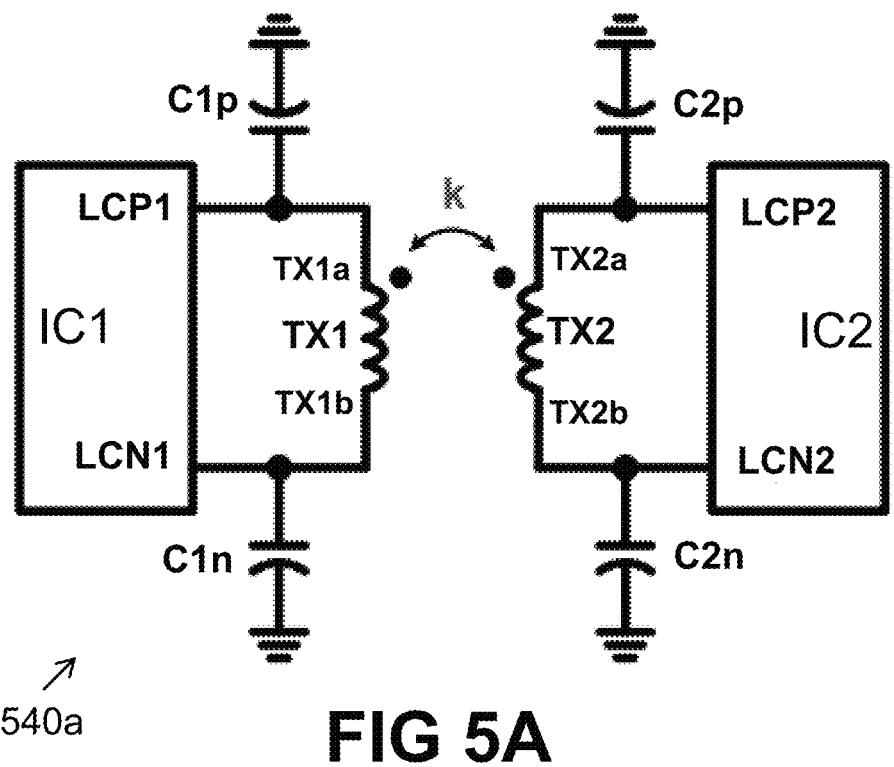
FIG. 5A is a schematic representation of an electric circuit comprising two integrated devices, each connected to a respective transmitter coil and two capacitors to form a respective LC oscillator circuit.

FIG. 5A is a schematic and simplified representation of a simple implementation of two times the hardware of FIG. 3. FIG. 5A shows an electric circuit 540 comprising two integrated devices, each connected to a respective transmitter coil and two capacitors to form two respective LC oscillator circuits. The receiver coils are not shown in FIG. 5A.

The circuit 540a of FIG. 5A comprises a first integrated device IC1 having two oscillator pins LCP1, LCN1 connected to opposite ends TX1a, TX1b of a first transmitter coil TX1, and a capacitor C1p connected between the first oscillator pin LCP1 and a reference voltage (in the example: ground), and a capacitor C1n connected between the second oscillator pin LCN1 and a reference voltage (in the example: ground), but other reference voltages may also be used. The two reference voltages may also have different value (e.g. C1p may be connected between LCP1 and a supply voltage, and C1n may be connected between LCN1 and ground).

The circuit 540a of FIG. 5A further comprises a second integrated device IC2 having two oscillator pins LCP2, LCN2 connected to opposite ends TX2a, TX2b of a second transmitter coil TX2, and a capacitor C2p connected between the first oscillator pin LCP2 and a reference voltage (in the example: ground), and having a capacitor C2n connected between the second oscillator pin LCN2 and a reference voltage (in the example: ground), but other reference voltages may also be used. The two reference voltages may have a different value, and these values may even be different from the reference voltages applied to C1p and C1n.

The two transmitter coils TX1, TX2 are laid out on the PCB in a tightly coupled manner. Preferably the coupling coefficient (k) is between 0.9 and 1.0. In the schematics view of FIG. 5A, the transmitter coils TX and TX2 are inductively coupled, as schematically indicated by the dots, and the arrow, and the coupling factor "k". The dots represent the winding direction of the coils, thus representing a polarity, in accordance with notations known in the art.

In dual IC applications, the common LCO frequency can then be calculated or estimated using the following formula:

$$f_{LCO} = \frac{1}{2\pi\sqrt{(1+k)L_{TX}\frac{C_{TX}}{2}}} \cong \frac{1}{2\pi\sqrt{L_{TX}C_{TX}}} \qquad [1]$$

The approximation is valid for values of k equal to 1.0 or approximately equal to 1.0. In normal operation, both LCO's will oscillate ideally at this same frequency, at a same phase and a same amplitude.

Figure 5B:
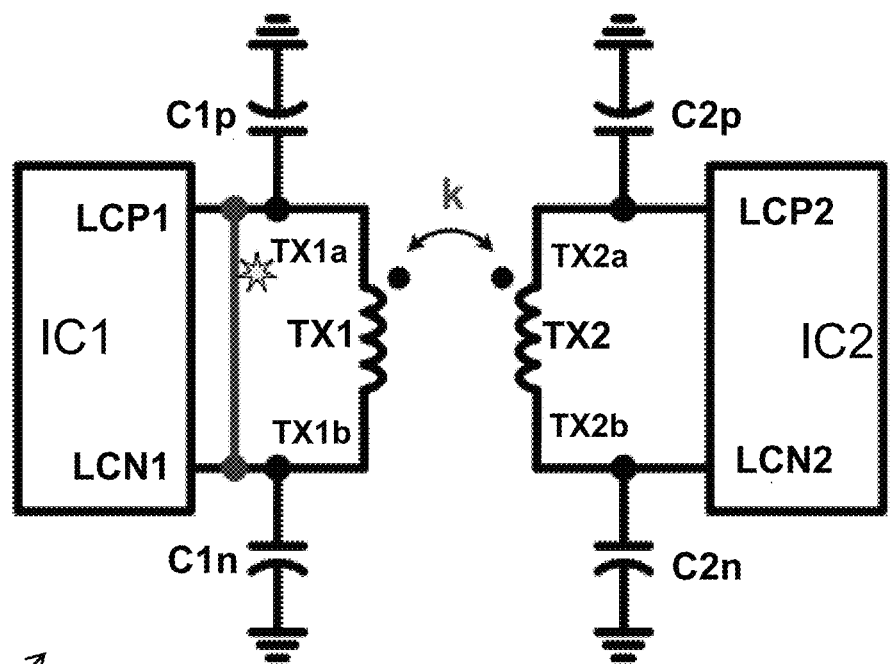
FIG. 5B shows a possible failure mode of the circuit of FIG. 5A, namely a short circuit between the two oscillator pins LCP1, LCN1 of the first integrated device.

FIG. 5B shows a circuit 540b similar to the circuit 540a of FIG. 5A but with the addition of an inadvertent (or unintended) short between LCP1 and LCN1 of IC1 and illustrates that the circuit 540a proposed in FIG. 5A is not robust against a short-circuit between LCP1 and LCN1 (schematically indicated by a black line and a star symbol). If a fault occurs in the field, leading to a short circuit between the oscillator pins LCP1 and LCN1 of IC1, then by impedance transformation through the mutually coupled inductors, the LCO of the second integrated device IC2 is also loaded by this short circuit. In end effect, the oscillation of both LCOs will stop, and none of the integrated devices will be capable of measuring an angle. This would be considered as a "single-point fault", which is (of course) undesirable. Such shorts may for instance occur due to solder wear out of the pins LCP1 and LCN1 of the integrated device IC1 on the PCB (not shown) during actual use of the product, especially if the pins LCP1 and LCN1 are neighbouring pins.

Figure 6A:
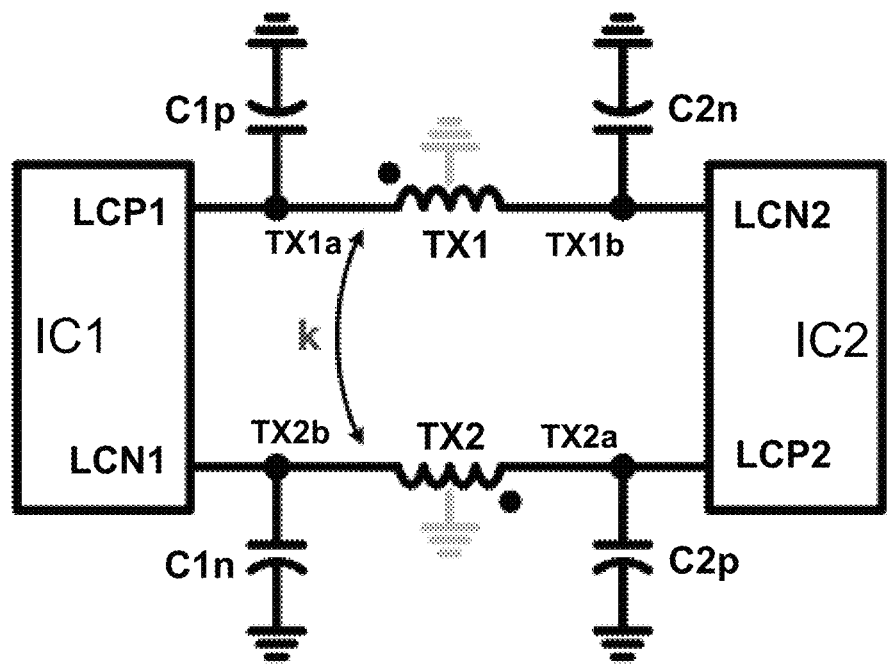
FIG. 6A is a schematic representation of a first embodiment of an electric circuit proposed by the present invention, that can be used in the inductive angle sensor arrangement of FIG. 4A or FIG. 4B.

FIG. 6A is a schematic and simplified representation of a first embodiment of an electric circuit 640a proposed by the present invention, that can be used in the inductive angle sensor arrangement 400a of FIG. 4A or 400b of FIG. 4B, or variants thereof.

The inventors came to the idea to connect the first transmitter coil TX1 between an oscillator pin (e.g. LCP1) of the first integrated device IC1 and an oscillator pin (e.g. LCN2) of the second integrated device IC2 rather than between the two oscillator pins LCP1, LCN1 of IC1, and likewise, to connect the second transmitter coil TX2 between an oscillator pin LCP2 of the second integrated device IC2 and an oscillator pin LCN1 of the first integrated device IC1, rather than between the two oscillator pins LCP2, LCN2 of IC2. When connected in this way, the first transmitter coil TX1 and the second transmitter coil TX2 together form an "inductively coupled transmitter coil system", which can be excited by IC1 or by IC2 or by both. The winding direction (thus the polarity) of the transmitter coils TX1, TX2 is preferably chosen such that the coils are arranged in an antiparallel way, e.g. as illustrated in FIG. 6A. Such antiparallel connection might be chosen, if IC1 and IC2 are identical integrated devices or have at least the same electrical circuitry for driving the transmitter coils. If one of the ICs has an inverted signal behaviour for driving a transmitter coil, then the coils might be arranged in a parallel way.

As indicated, the two transmitter coils TX1, TX2 are inductively coupled with a coupling factor (k), preferably having a value in the range from 0.9 to 1.0.

It was surprisingly found that, in "normal operation" (e.g. steady state operation and in the absence of a fault-condition), the two LCO's (the first LCO being formed by C1p, TX1, C2n; and the second LCO being formed by C1n, TX2, C2p) will oscillate together in a push-pull manner at the same oscillation frequency as the configuration of FIG. 5A, but with virtual grounds (schematically indicated by the ground symbols in grey) forming at the middle of each transmitter coil TX1, TX2.

Figure 6B:
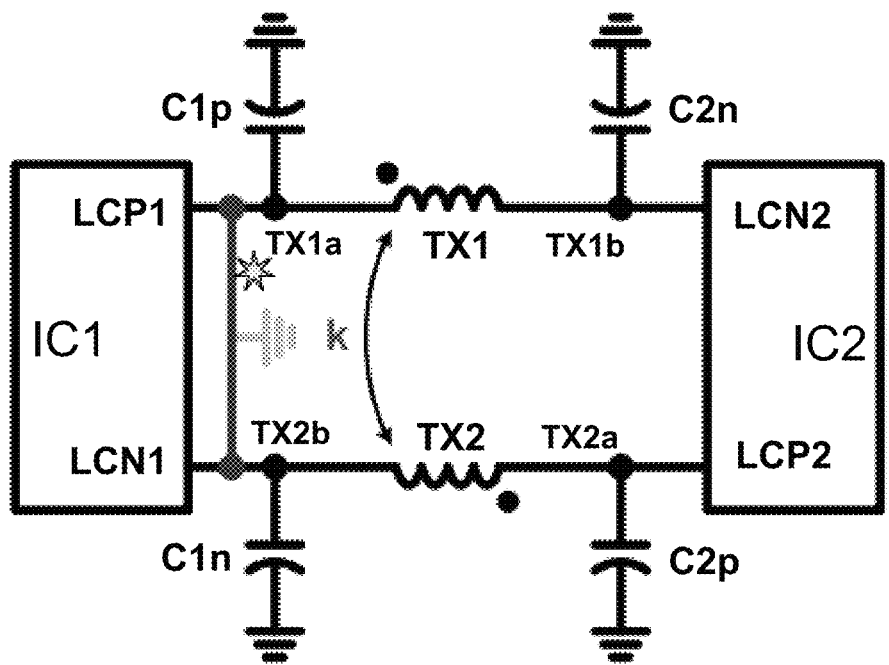
FIG. 6B shows that the circuit of FIG. 6A is tolerant to a short circuit between the two oscillator pins LCP1, LCN1 of the first integrated device.

FIG. 6B shows a circuit 640b similar to the circuit 640a of FIG. 6A but with the addition of an inadvertent (or unintended) short circuit between LCP1 and LCN1 of IC1 and illustrates that the circuit 640a of FIG. 6A is tolerant to a short-circuit connection (schematically indicated by a black line and a star symbol) between the two oscillator pins LCP1, LCN1 of the first integrated device IC1. Indeed, if LCP1 is shorted to LCN1, it will only kill the oscillation over the pins LCP1, LCN1 of the first integrated device IC1, but the second integrated device IC2 will still be able to oscillate its pins LCN2, LCP2 at a frequency which can then be calculated or estimated using the following formula:

$$f_{LCO} = \frac{1}{2\pi\sqrt{2(1+k)L_{TX}\frac{C_{TX}}{2}}} \cong \frac{1}{2\pi\sqrt{2L_{TX}C_{TX}}} \qquad [2]$$

The approximation is valid for values of k equal to 1.0 or approximately equal to 1.0.

When LCP1 and LCN1 are shorted, the "inductively coupled transmitter coil system" can no longer be excited by IC1, but it can still be excited by IC2, causing an alternating current to flow through TX1 and TX2, which induces an alternating magnetic field through both sets of receiver coils, which is modulated by the respective targets, allowing both integrated devices IC1, IC2 to determine a respective angle.

It is noted that the virtual ground is now no longer situated in the middle of the transmitter coils but has shifted to the position of the short-circuit itself (as schematically indicated by the ground symbol in grey), hence, the capacitors C1p, C1n connected to the short-circuit do not play a major role in the value of the LCO frequency.

Comparing formula [2] with formula [1] shows that the LCO frequency of the circuit 640b of FIG. 6B wherein LCP1 and LCN1 are shorted, is reduced by a factor of about √2 (about 1.4), but this is enough for the application to continue to function, albeit possibly with a degraded accuracy.

In an embodiment, the integrated devices IC1, IC2 are further configured to detect the loss of oscillation on IC1 and/or to detect or measure the frequency (or the change of frequency) on IC2, and to report this information or condition, e.g. to an external processor (not shown) communicatively connected to the integrated devices IC1, IC2.

FIG. 6B shows that the circuit 640b continues to function correctly, even in case the pins LCP1 and LCN1 are shorted. A similar reasoning can be provided for the case where the pins LCP2 and LCN2 are shorted (while LCP1 and LCN1 are not shorted). In that case the oscillation over the pins LCP2 and LCN2 will stop, but the oscillation over the pins LCP1 and LCN1 will continue, hence the inductively coupled transmitter coil system can still be excited, and the two integrated devices can both determine an angular position, albeit possibly with a degraded accuracy.

Figure 6C:
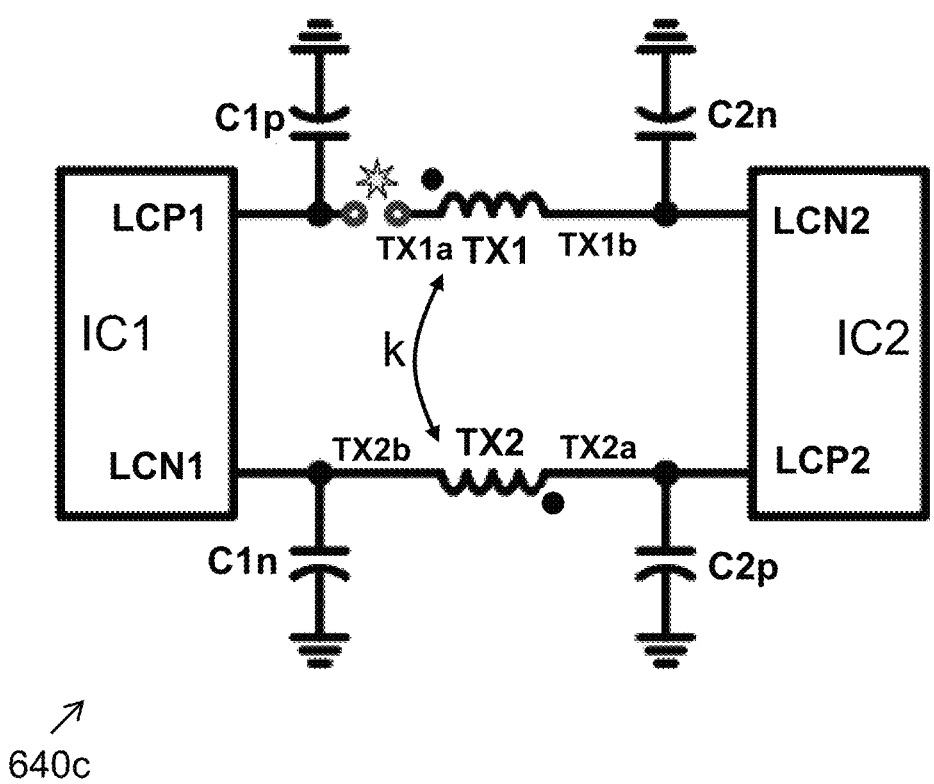
FIG. 6C shows that the circuit of FIG. 6A is not tolerant to a disconnection between an oscillator pin (e.g. LCP1) of an integrated device, and a transmitter coil (e.g. TX1).

FIG. 6C shows a circuit 640c similar to the circuit 640a of FIG. 6A but wherein the oscillator pin LCP1 is not connected to the first transmitter coil TX1. FIG. 6C shows that the circuit 640a of FIG. 6A is not tolerant to a disconnection (or "open circuit") between an oscillator pin of an integrated device and a transmitter coil, in the example shown: a disconnect between LCP1 of IC1 and a first end TX1a of the transmitter coil TX1, but the same reasoning is also true for a disconnection between TX1 and LCN2, and for a disconnection between TX2 and LCP2, and for a disconnection between TX2 and LCN1. In the circuit 640c of FIG. 6C, both LCO's will stop oscillating because the oscillating current path is interrupted. Thus FIG. 6C shows an example where a "single-point fault" in the circuit 640a of FIG. 6A will not allow the circuit to continue to operate, or in other words, does not result in a "fail-operational" behaviour. Such an "open circuit" may occur for example during actual use, because of a wear out of a connection on the PCB within e.g. one conductive layer or e.g. two conductive layers.

Figure 7A:
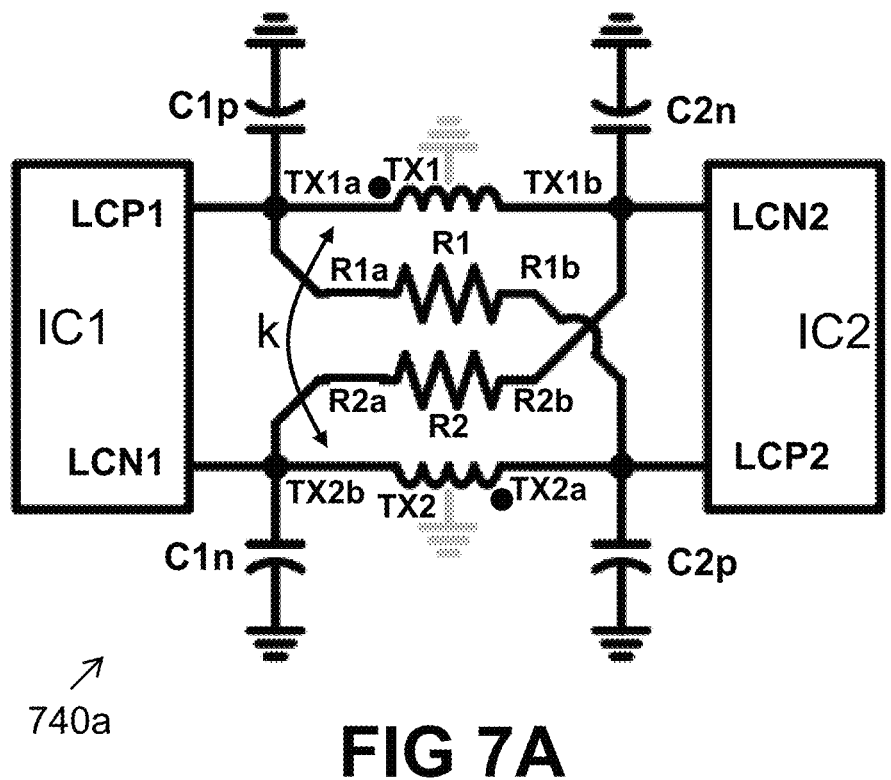
FIG. 7A is a schematic representation of a second embodiment of an electric circuit proposed by the present invention, that can be used in the inductive angle sensor arrangement of FIG. 4A or FIG. 4B.

FIG. 7A is a schematic representation of a second embodiment of an electric circuit 740a proposed by the present invention, that can be used in the inductive angle sensor arrangement 400a of FIG. 4A or 400b of FIG. 4B, or variants thereof.

The circuit 740a of FIG. 7A can be seen as a variant of the circuit 640 of FIG. 6A, with the addition of two cross-coupled resistors, namely a first resistor R1 connected between LCP1 of the first chip IC1 and LCP2 of the second chip IC2, and a second resistor R2 connected between LCN1 of the first chip IC1 and LCN2 of the second chip IC2.

Similar to the circuit 640a of FIG. 6A, it was found that in the circuit 740a of FIG. 7A, in "normal operation" (e.g. steady state operation and in the absence of a fault-condition), the two LCO's will oscillate together in a push-pull manner at the same oscillation frequency as the configuration of FIG. 6A, with virtual grounds forming at the middle of each transmitter coil TX1, TX2. Indeed, in "normal operation" substantially no current is flowing through the resistors R1, R2, since both LCO's have the same amplitude and phase, thus a potential difference over the resistor R1 and over R2 is zero at all times, hence, the resistor values R1 and R2 do not degrade the Q-factor.

Figure 7B:
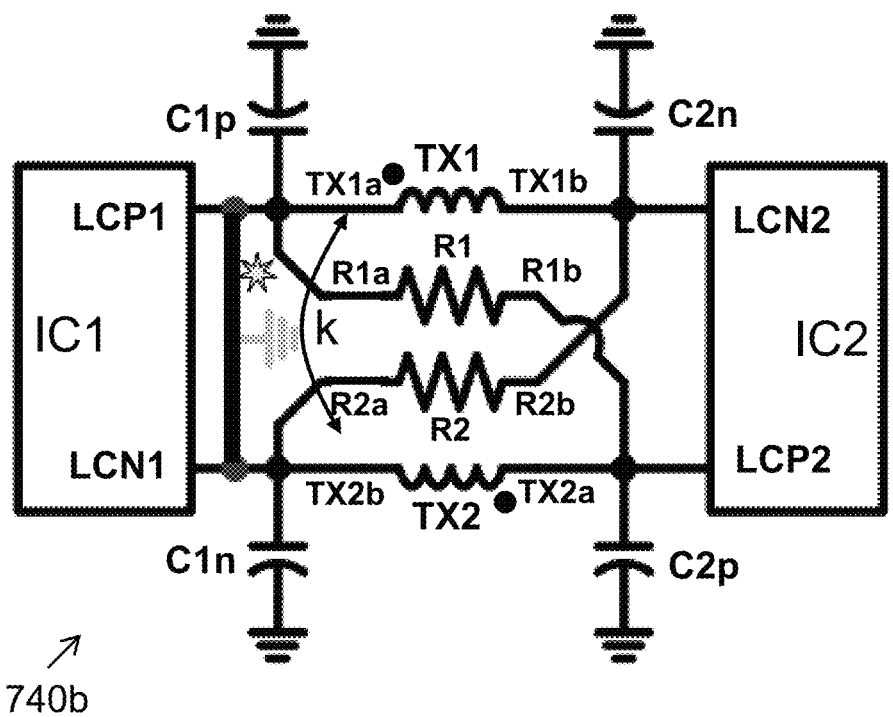
FIG. 7B shows that the circuit of FIG. 7A is tolerant to a short circuit between the two oscillator pins LCP1, LCN1 of the first integrated device.

FIG. 7B shows a circuit 740b similar to the circuit 740a of FIG. 7A but with the addition of an inadvertent (or unintended) short circuit between LCP1 and LCN1 of IC1, and illustrates that the circuit 740a of FIG. 7A is tolerant to a short-circuit connection between the two oscillator pins LCP1, LCN1 of the first integrated device IC1. When LCP1 is shorted to LCN1, it will kill the oscillation over the pins LCP1, LCN1 of the first integrated device IC1, but the second integrated device IC2 will still be able to oscillate its pins LCN2, LCP2. As a consequence of the short circuit, the second integrated device IC2 will see the resistors R1, R2 in parallel with the transmitter coils. This degrades the Q-factor and leads to an increase in current consumption. A relatively large value of R1 and R2 is desirable in this case. As the configuration is fully symmetrical, a short circuit between the oscillator pins LCP2 and LCN2 of IC2 (in the absence of a short circuit between LCP1 and LCN1) will lead to the same effect.

Figure 7C:
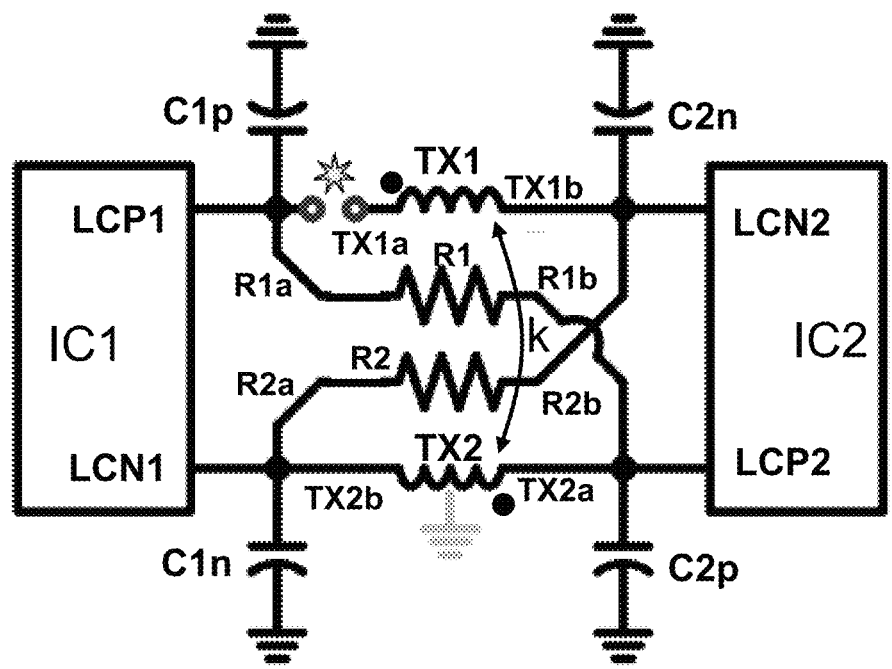
FIG. 7C and FIG. 7D show that the circuit of FIG. 7A is tolerant to a disconnection between an oscillator pin (e.g. LCP1) of an integrated device, and a transmitter coil (e.g. TX1).

FIG. 7C shows a circuit 740c similar to the circuit 740a of FIG. 7A but with an inadvertent or unintended disconnection between an oscillator pin of an integrated device and a transmitter coil and illustrates that the circuit 740a of FIG. 7A is tolerant to such a single failure.

In the example shown, the oscillator pin LCP1 is disconnected from the transmitter coil TX1. As a consequence of this disconnection, no current can flow through TX1, and the first integrated device IC1 sees the load (between its oscillator pins) as a series connection of R1 and TX2, and the second integrated device IC2 sees the load (between its oscillator pins) as a series connection of R2 and TX2. This degrades the Q-factor and leads to an increase in current consumption. A relatively small value of R1 and R2 is desirable in this case. Assuming that R1=R2=0 for simplicity, the resulting oscillation frequency can be estimated using the following formula:

$$f_{LCO} = \frac{1}{2\pi\sqrt{L_{TX}\frac{2C_{TX}}{2}}} \cong \frac{1}{2\pi\sqrt{L_{TX}C_{TX}}} \quad [3]$$

This actually means no frequency change, because the effective inductance is halved, while the effective capacitance is doubled. However, in reality, the resistor values are not zero, the resonance frequency is reduced, current consumption is increased, and the Q-factor is degraded.

Since each of the cases shown in FIG. 7B and FIG. 7C may occur in practice, and both degrade the Q-factor, and lead to an increase in current consumption, and one favours a large resistance value, and the other favours a low resistance value, a compromise needs to be found. A skilled person having the benefit of the present disclosure can easily find a suitable value of R1 and R2 by experimentation. But as a rule of thumb, if the transmitter coils have an inductance in the range from 3.0 to 5.0 µH (e.g. equal to about 4.0 µH), and if the Capacitors have a value of about 1 nF, resulting in a resonance frequency of about 2.5 MHz, the resistors R1 and R2 may have a resistance in the range from 30 to 120 Ohm, or from 45 to 90 Ohm, or from 50 to 70 Ohm. But of course, the present invention is not limited to this example, and solutions with other values for the transmitter coils, and for the capacitors, and for the resonance frequency, and for the resistors, can also be used.

Figure 7D:
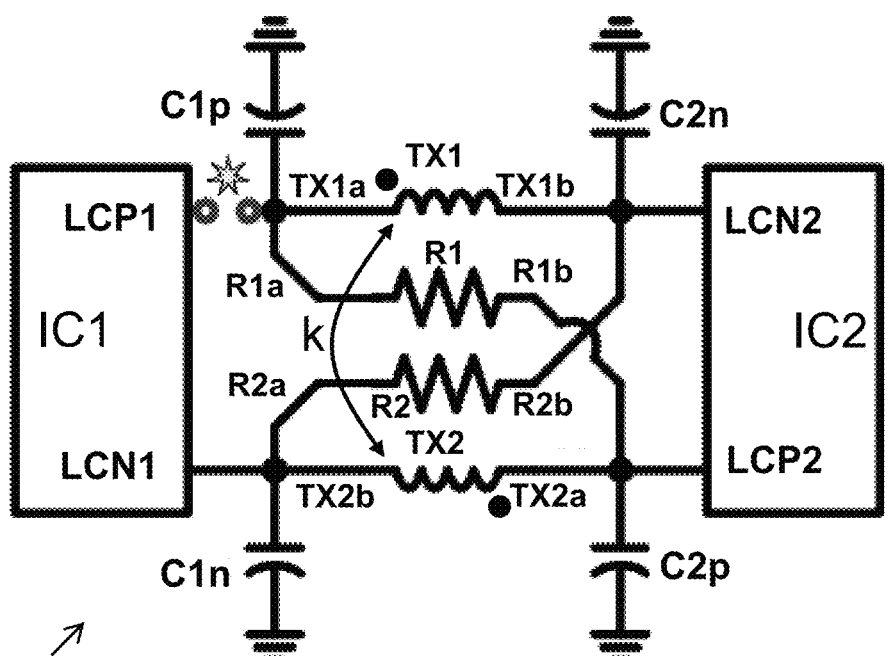

FIG. 7D shows a circuit 740d similar to the circuit 740a of FIG. 7A but with an inadvertent or unintended open solder joint at an oscillator pin (e.g. LCP1) and illustrates that the circuit 740a of FIG. 7A is tolerant to such a single failure.

It was surprisingly found that, in this case, the frequency of both oscillators (one formed by C1p, TX1, C2n; the other formed by C2p, TX, C1n) is substantially unchanged, since there is no change in the LC configuration. It was found that the resistor values R1, R2 do not greatly reduce the Q-factor in this case. A side effect is a change in the current distribution of the two LCO's where the one with the open pin (in the example: IC1) now provides less oscillating current as compared to the other one. The integrated devices IC1, IC2 may be configured to detect this difference, and to report such a detection, e.g. to an external controller. As the configuration is fully symmetrical, a single open solder joint on any of the oscillator pins (LCP1, LCN1, LCP2, LCN2) will lead to the same effect.

Figure 7E:
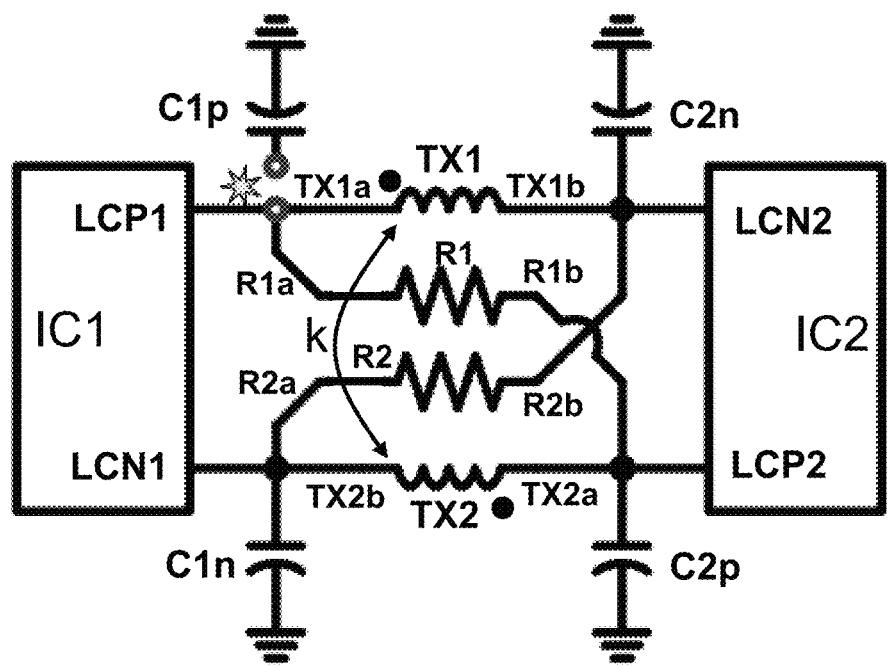
FIG. 7E shows that the circuit of FIG. 7A is tolerant to a disconnection between an oscillator pin (e.g. LCP1) of an integrated device, and a capacitor (e.g. C1p).

FIG. 7E shows a circuit 740e similar to the circuit 740a of FIG. 7A but with an inadvertent or unintended open solder joint of one of the capacitors (e.g. C1p) and illustrates that the circuit 740a of FIG. 7A is tolerant to such a single failure.

Since the LC configuration changes due to this "open", the frequency will also change. This case is more complex to analyse, but assuming that R1=R2=0 for simplicity, the resulting oscillation frequency can in a first order approximation be estimated using the following formula:

$$f_{LCO} = \frac{1}{2\sqrt{\frac{(1+k)L_{TX}}{2}\frac{2C_{TX}}{3}}} \cong \frac{1}{2\pi\sqrt{\frac{2}{3}L_{TX}C_{TX}}} \quad [4]$$

This means that the LCO frequency will be increased roughly by a factor of $\sqrt{1.5}$ (about 1.2), but the application will continue to function correctly, albeit possibly with a degraded accuracy.

As in FIG. 7D, there is a slight redistribution of the current contribution from each LCO, but the resistor values do not greatly reduce the Q-factor in this case. The integrated devices IC1, IC2 may be configured to detect this frequency difference, and/or this different in the current contribution, and to report such a detection, e.g. to an external controller (not shown) communicatively connected to the integrated devices IC1, IC2. As the configuration is fully symmetrical, a single open solder joint on any of the capacitor C1p, C1n, C2p, C2n will lead to the same effect.

Figure 7F:
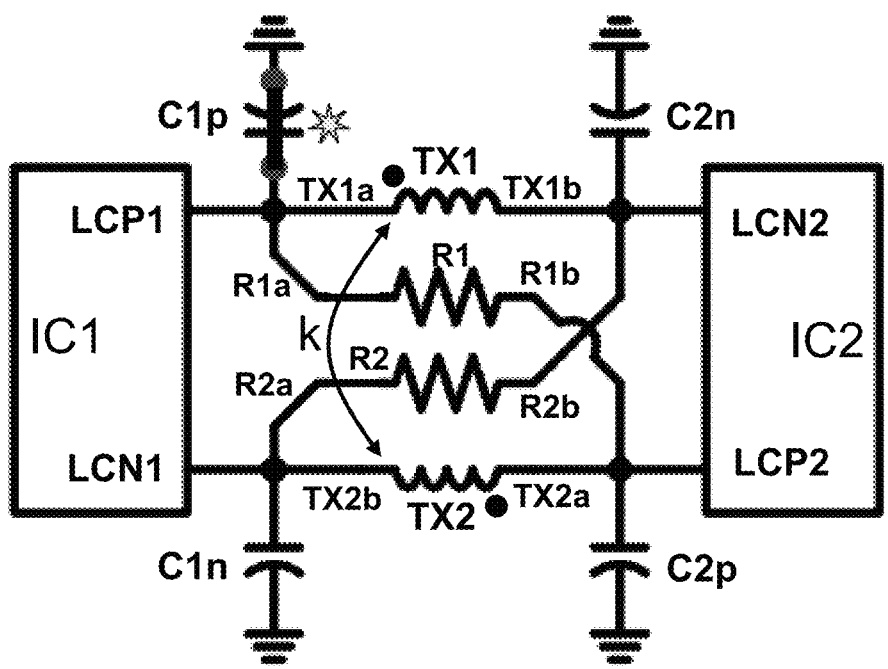
FIG. 7F shows that the circuit of FIG. 7A is tolerant to a short circuit of a capacitor (e.g. C1p), or to a short circuit between an oscillator pin (e.g. LCP1) and ground.

FIG. 7F shows a circuit 740f similar to the circuit 740a of FIG. 7A but with an inadvertent or unintended short circuit across one of the capacitors and illustrates that the circuit 740a of FIG. 7A is tolerant to such a single failure. In the example of FIG. 7F, the terminals of C1p are shorted, thereby effectively connecting LCP1 to ground. Since the LC configuration changes due to this short, the oscillation frequency will also change.

This case is more complex to analyse, but assuming that R1=R2=0 for simplicity, the resulting oscillation frequency can in a first order approximation be estimated using the following formula:

$$f_{LCO} = \frac{1}{2\pi\sqrt{\frac{(1+k)L_{TX}}{2}2C_{TX}}} \cong \frac{1}{2\pi\sqrt{2L_{TX}C_{TX}}}$$

This means that the LCO frequency will be reduced by a factor of $\sqrt{2}$ (about 1.4), but the application will continue to function correctly, albeit possibly with a degraded accuracy.

Unlike the previous cases, this short of one capacitor to ground may lead to an increase in current consumption of both LCO's, which may be mitigated by an internal current limiting mechanism inside the integrated devices IC1, IC2.

The integrated device may be configured to detect this frequency difference, and/or this increase in current contribution, and to report such a detection, e.g. to an external controller (not shown) communicatively connected thereto. As the configuration is fully symmetrical, a single short circuit across any of the capacitors C1p, C1n, C2p, C2n will lead to the same effect.

Figure 7G:
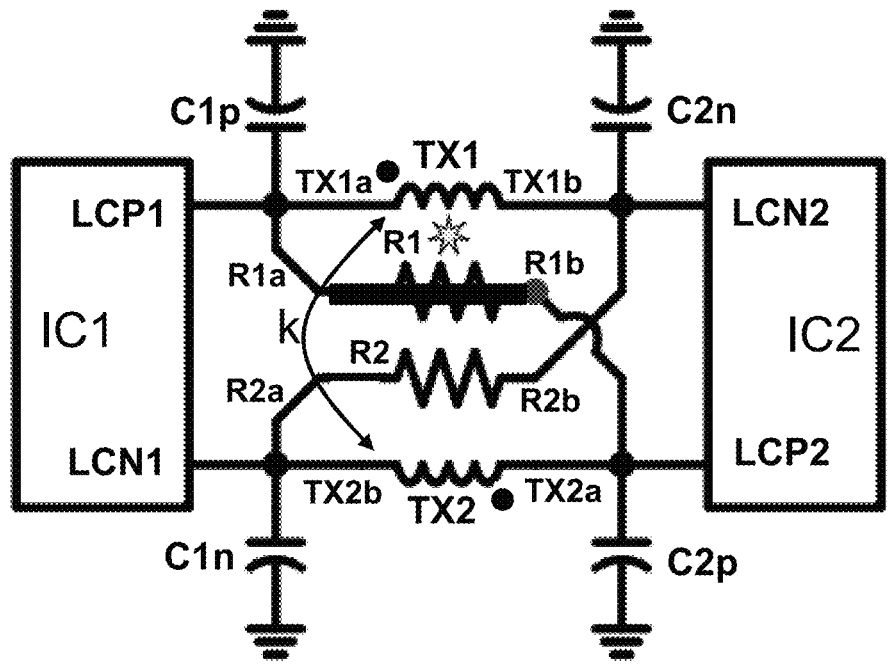
FIG. 7G shows that the circuit of FIG. 7A is tolerant to a short circuit of a resistor (e.g. R1).

FIG. 7G shows a circuit 740g similar to the circuit 740a of FIG. 7A but with an inadvertent or unintended short circuit across one of the resistors and illustrates that the circuit 740a of FIG. 7A is tolerant to such a single failure. In the example of FIG. 7G, the terminals R1a and R1b of R1 are shorted.

Since the LC configuration is not affected due to this short, and since under normal conditions there is no voltage over the resistors anyway, the LCO frequency, the amplitude and the current consumption do not change.

While this single fault does not have a noticeable effect, it may be worth to detect and report this fault anyway, in order to reduce the risk and consequences of a double or a triple fault. In an embodiment, the integrated devices IC1, IC2 are configured to detect the presence of the correct resistor values of R1 and R2, e.g. during a startup-check. Such a test may comprise for example: applying a predefined voltage over said oscillator pins and measuring a current; or may comprise for example the measurement of a time constant when charging or discharging a capacitor through said resistor. As the configuration is fully symmetrical, a single short circuit across any of the resistors R1, R2 will lead to the same effect.

Figure 7H:
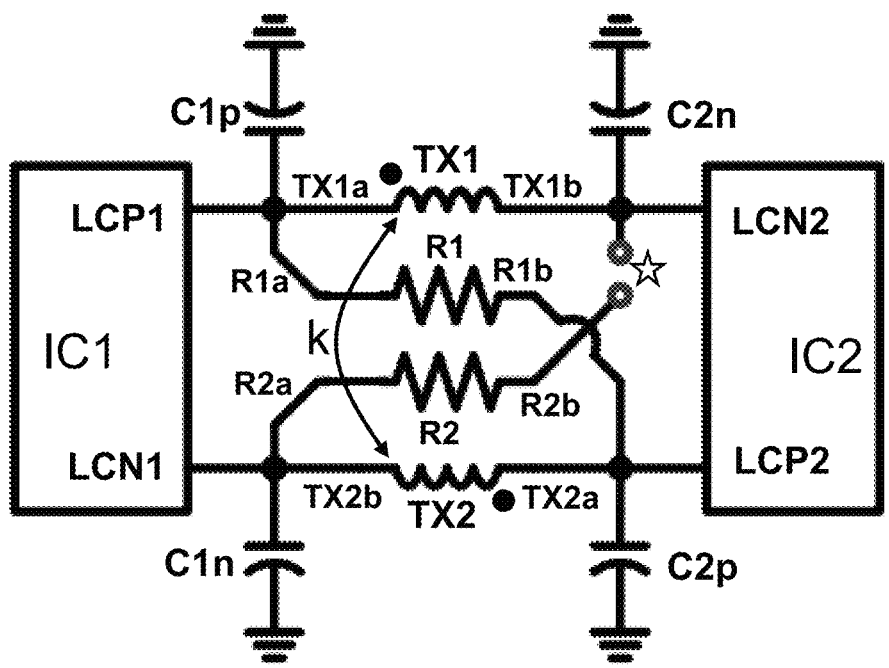
FIG. 7H shows that the circuit of FIG. 7A is tolerant to a disconnection between an oscillator pin (e.g. LCN2) and a resistor (e.g. R2).

FIG. 7H shows a circuit 740h similar to the circuit 740a of FIG. 7A but with an inadvertent or unintended disconnection or an open solder joint between an oscillator pin (e.g. LCN2) and one of the resistors (e.g. R2) and illustrates that the circuit 740a of FIG. 7A is tolerant to such a single failure.

Since the LC configuration is not affected due to this disconnection, and since under normal conditions there is no voltage over the resistors R1, R2 anyway, the LCO frequency, the amplitude and the current consumption do not change.

Again, while this single fault does not have a noticeable effect, it may be worth to detect and report this fault anyway, in order to reduce the risk and consequences of a double or a triple fault. As the configuration is fully symmetrical, a single disconnection or an open solder joint between any of the oscillator pins LCP1, LCN1, LCP2, LCN2 and an associated resistor R1, R2 will lead to the same effect.

Figure 8:
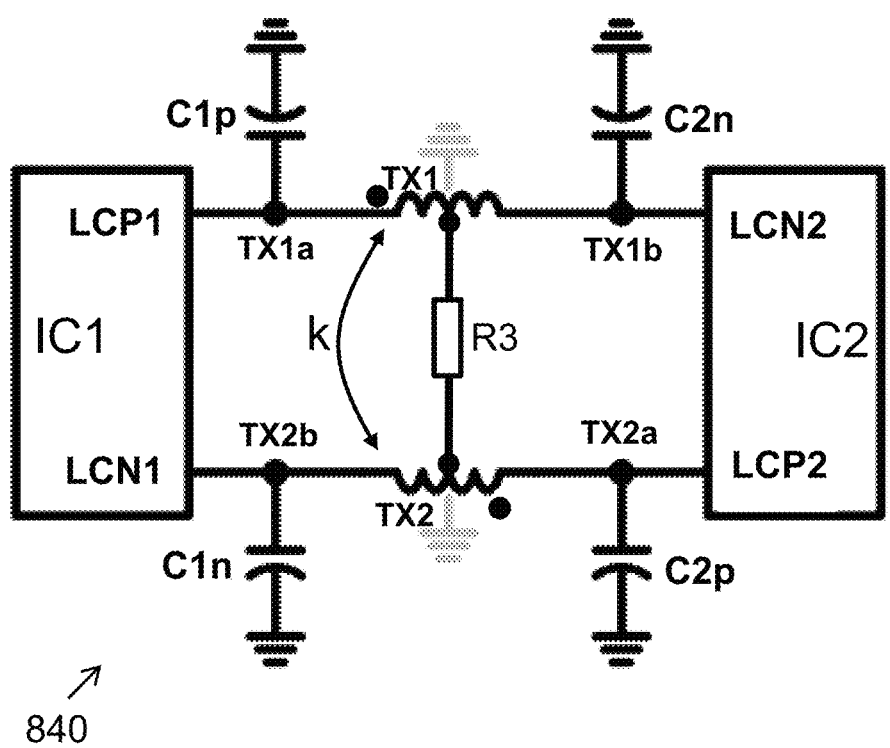
FIG. 8 is a schematic representation of a third embodiment of an electric circuit proposed by the present invention, that can be used in the inductive angle sensor arrangement of FIG. 4A or FIG. 4B.

FIG. 8 is a schematic representation of a third embodiment of an electric circuit 840 proposed by the present invention, that can be used in the inductive angle sensor arrangement 400a of FIG. 4A or 400b of FIG. 4B, or variants thereof.

The circuit 840 of FIG. 8 can be seen as a variant of the circuit 640 of FIG. 6A with the addition of a low-resistance connection between the centre-taps of the two transmitter coils TX1, TX2, e.g. by means of a resistor R3, preferably having a resistance value smaller than 20 Ohm, or smaller than 10 Ohm, or smaller than 5 Ohm, or even smaller than 1 Ohm, or by means of a PCB layout track.

The circuit 840 of FIG. 8 offers the advantage over the circuit 740 of FIG. 7A that no discrete resistors R1, R2 need to be mounted on the PCB (i.e. easier to produce, and having a lower component count), but it may lead to larger frequency deviations in some of the failure modes described above.

Also, this circuit 840 is tolerant to the faults described above, e.g. as illustrated in FIG. 7B to FIG. 7F.

It is noted that the technique with the two resistors R1, R2 arranged as illustrated in FIG. 7A, and the technique with the single resistor R3 arranged as illustrated in FIG. 8, can work independently, but may also be combined.

Figure 9:
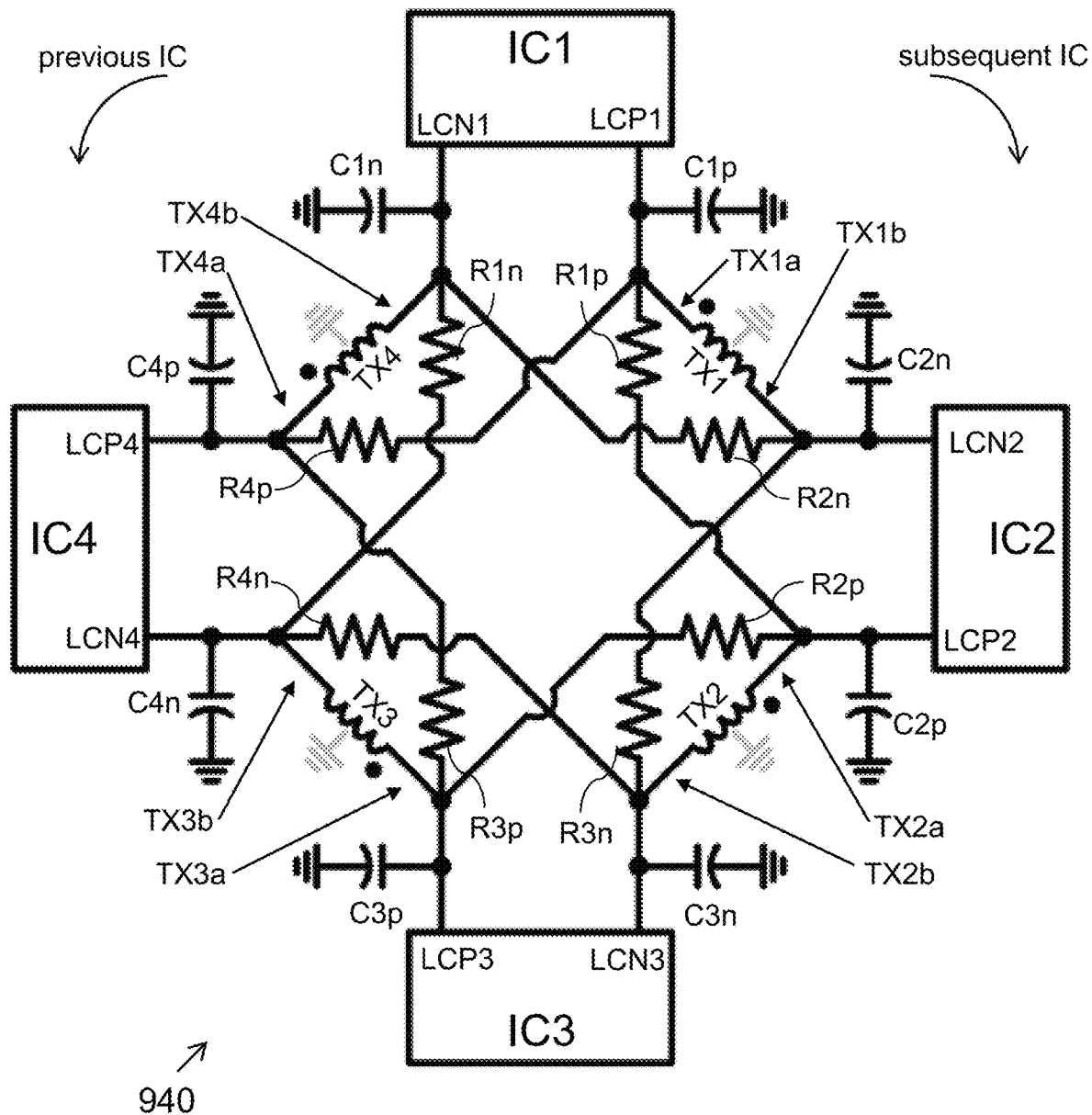
FIG. 9 is a schematic representation of a fourth embodiment of an electric circuit proposed by the present invention, that can be used in the inductive angle sensor arrangement of FIG. 4A or FIG. 4B.

FIG. 9 is a schematic representation of a fourth embodiment of an electric circuit 940 proposed by the present invention, that can be used in the inductive angle sensor arrangement 400a of FIG. 4A or 400b of FIG. 4B, or variants thereof. While not explicitly shown, each IC may be connected to a set of 2 or 3 receiver coils.

The circuit 940 can be considered as a variant of the circuit 740 of FIG. 7A, but having four integrated devices IC1, IC2, IC3, IC4 instead of only two, and having four transmitter coils TX1, TX2, TX3, TX4, and having a first set of four cross-coupled resistors Rxp (where "x" is an integer value from 1 to 4) between the LCP pins of two integrated devices, and having a second set of four cross-coupled resistors Rxn (where "x" is an integer value from 1 to 4) between the LCN pins of two integrated devices.

More specifically, FIG. 9 shows a schematic representation of an electric circuit 940 that can be used in the inductive angle sensor arrangement 400a of FIG. 4A or 400b of FIG. 4B, or variants thereof, the circuit 940 comprising:
- a number N of inductively coupled transmitter coils (e.g. TX1, TX2, TX3, TX4) together forming an inductively coupled transmitter coil system, N being at least three;
- a plurality (e.g. also N) of receiver coil sets (not shown), each set of receiver coils comprising at least two or at least three receiver coils;
- said number N of integrated devices (e.g. IC1, IC2, IC3, IC4), each integrated device having a first and a second oscillator pin (IC1: LCP1, LCN1; IC2: LCP2, LCN2; IC3: LCP3, LCN3; IC4: LCP4, LCN4), and each integrated device having an excitation circuit (not explicitly shown) for providing an alternating signal over its oscillator pins, and each integrated device having an evaluation circuit (not explicitly shown) for evaluating signals obtained from one of the sets of receiver coils;
- at least one movable target (not explicitly shown, but typically only one target, or only two targets) for providing an inductive coupling between the inductively coupled transmitter coil system and each set of receiver coils;
- wherein each transmitter coil (TX1, TX2, TX3, TX4) has a first end (TX1a, TX2a, TX3a, TX4a) operatively connected to a first oscillator pin (LCP1, LCP2, LCP3, LCP4) of a first integrated device (IC1, IC2, IC3, IC4), and has a second end (TX1b, TX2b, TX3b, TX4b) operatively connected to a second oscillator pin (LCN2, LCN3, LCN4, LCN1) of a subsequent integrated device (IC2, IC3, IC4, IC1).

On a schematic representation where the integrated devices are located on a virtual circle (e.g. as illustrated in FIG. 9), the term "subsequent integrated device" can mean e.g. "the next IC in clockwise direction", thus in FIG. 9: IC2 is subsequent of IC1, IC3 is subsequent of IC2, IC4 is subsequent of IC3, IC1 is subsequent of IC4. And the term "previous integrated device" can mean e.g. "the next IC in counter-clockwise direction", thus in FIG. 9: IC1 is previous of IC2, IC2 is previous of IC3, IC3 is previous of IC4, IC4 is previous of IC1.

The inductive angle sensor may further comprise one or both of:
i) a number N of first electrical resistors (R1p, R2p, R3p, R4p) having a first end connected to a first oscillator pin (LCP1, LCP2, LCP3, LCP4) of a first integrated device (IC1, IC2, IC3, IC4) and having a second end connected to the first oscillator pin (LCP2, LCP3, LCP4, LCP1) of a subsequent integrated device (IC2, IC3, IC4, IC1);
ii) a number N of second electrical resistors (R1n, R2n, R3n, R4n) having a first end connected to a second oscillator pin (LCN1, LCN2, LCN3, LCN4) of a first integrated device (IC1, IC2, IC3, IC4) and having a second end connected to the second oscillator pin (LCN4, LCN1, LCN2, LCN3) of a previous integrated device (IC4, IC1, IC2, IC3).

In a variant of FIG. 9, the circuit has only three integrated devices and an equal number of transmitter coils.

In another variant of FIG. 9, the circuit has more than four integrated devices and an equal number of transmitter coils.

In another or a further variant of FIG. 9, the first set of cross-coupled resistors are omitted, or the second set of cross-coupled resistors are omitted, or both sets of cross-coupled resistors are omitted (e.g. as in FIG. 6A).

In another or a further variant of FIG. 9, the first set and the second set of cross-coupled resistors are omitted, but resistors and/or PCB tracks are added to interconnect centre tabs of the transmitter coils with each other.

REFERENCES 300 angular sensor system
110, 310, 410 printed circuit board
311 coil system
112, 312 movable target
400a, 400b angular sensor arrangement (including at least: PCB, targets, integrated devices)
320 integrated device (IC or chip)
321 oscillator circuit
322 amplifier
323 demodulator or rectifier & filter
324 Non-Volatile memory (e.g. flash)
325 controller
326 Digital Signal Processor (DSP)
327 Analog-to-Digital-Convertor (ADC)
412a, 412a' first movable target
412b, 412b' second movable target
441 torsion bar
442 input shaft portion
443 output shaft portion
444 shaft
TX transmitter coil
RX1a, RX1b, RX1c first set of receiver coils
RX2a, RX2b, RX2c second set of receiver coils
TX1/TX2 first/second transmitter coil
TX1a/TX1b first/second end of the first transmitter coil
TX2a/TX2b first/second end of the second transmitter coil
R1, R2, R3 first, second, third resistor
R1a/R1b first/second end of the first resistor
R2a/R2b first/second end of the second resistor
C1p, C1n, C2p, C2n capacitor
R1p, R2p, R3p, R4p first set of resistors
R1n, R2n, R3n, R4n second set of resistors
540, 640, 740, 840, 940 electrical circuit

The invention claimed is:

1. An inductive angle sensor comprising:
a first transmitter coil (TX1);
a second transmitter coil (TX2) inductively coupled to the first transmitter coil (TX1), the first and the second transmitter coil together forming an inductively coupled transmitter coil system;
a first set of receiver coils (RX1a, RX1b, RX1c) comprising at least two or at least three receiver coils;
a second set of receiver coils (Rx2a, RX2b, RX2c) comprising at least two or at least three receiver coils;
a first integrated device (IC1) having a first oscillator pin (LCP1) and a second oscillator pin (LCN1), and having an excitation circuit for providing an alternating signal over its oscillator pins (LCP1, LCN1); and having a plurality of receiver pins connected to the first set of receiver coils (RX1a, RX1b, RX1c), and an evaluation circuit for evaluating signals obtained from the first set of receiver coils;
a second integrated device (IC2) having a first oscillator pin (LCP2) and a second oscillator pin (LCN2), and having an excitation circuit for providing an alternating signal over its oscillator pins (LCP2, LCN2); and having a plurality of receiver pins connected to the second set of receiver coils (RX2a, RX2b, RX2c), and an evaluation circuit for evaluating signals obtained from the second set of receiver coils;
at least one movable target (112; 312; 412a, 412a', 412b, 412b') for providing an inductive coupling between the inductively coupled transmitter coil system and each set of receiver coils;
wherein the first transmitter coil (TX1) has a first end (TX1a) operatively connected to the first oscillator pin (LCP1) of the first integrated device (IC1), and has a second end (TX1b) operatively connected to the second oscillator pin (LCN2) of the second integrated device (IC2); and
the second transmitter coil (TX2) has a first end (TX2a) operatively connected to the first oscillator pin (LCP2) of the second integrated device (IC2) and has a second end (TX2b) operatively connected to the second oscillator pin (LCN1) of the first integrated device (IC1).

2. The inductive angle sensor according to claim 1, wherein the first integrated device (IC1) is a first packaged semiconductor device having a plurality of pins, and wherein the first oscillator pin (LCP1) and the second oscillator pin (LCN1) of the first integrated device are adjacent pins of the first packaged semiconductor device; and/or
wherein the second integrated device (IC2) is a second packaged semiconductor device having a plurality of pins, and wherein the first oscillator pin (LCP2) and the second oscillator pin (LCN2) of the second integrated device are adjacent pins of the second packaged semiconductor device.

3. The inductive angle sensor according to claim 1, further comprising a first capacitor (C1p) having a first end connected to the first oscillator pin (LCP1) of the first integrated device (IC1) and a second end connected to a first reference voltage; and
further comprising a second capacitor (C1n) having a first end connected to the second oscillator pin (LCN1) of the first integrated device (IC1) and a second end connected to a second reference voltage; and
further comprising a third capacitor (C2p) having a first end connected to the first oscillator pin (LCP2) of the second integrated device (IC2) and a second end connected to a third reference voltage; and
further comprising a fourth capacitor (C2n) having a first end connected to the second oscillator pin (LCN2) of the second integrated device (IC2) and a second end connected to a fourth reference voltage.

4. The inductive angle sensor according to claim 1, wherein the first evaluation circuit is configured for determining a first angular value ($\alpha 1$) based on the signals obtained from the first set of receiver coils (RX1a, RX1b, RX1c); and
wherein the second evaluation circuit is configured for determining a second angular value ($\alpha 2$) based on the signals obtained from the second set of receiver coils (Rx2a, RX2b, RX2c).

5. The inductive angle sensor according to claim 1, wherein a central position of the first transmitter coil (TX1)

is electrically connected to a central position of the second transmitter coil (TX2) via a short circuit or via a resistor.

6. The inductive angle sensor according to claim 1, further comprising one or both of:
   a first resistor (R1) having a first end (R1a) connected to the first oscillator pin (LCP1) of the first integrated device (IC1) and having a second end (R1b) connected to the first oscillator pin (LCP2) of the second integrated device (IC2);
   a second resistor (R2) having a first end (R2a) connected to the second oscillator pin (LCN1) of the first integrated device (IC1) and having a second end (R2b) connected to the second oscillator pin (LCN2) of the second integrated device (IC2).

7. The inductive angle sensor according to claim 1, wherein each of the first and the second integrated device (IC1, IC2) is further configured to detect loss of oscillation over its first and second oscillator pin.

8. The inductive angle sensor according to claim 1, wherein the first and second integrated device (IC1, IC2) are further configured to determine a frequency value of an oscillation over its first and second oscillator pin and are further configured to detect an error based on this frequency value.

9. The inductive angle sensor according to claim 1, comprising a single movable target (112; 312; 412a', 412b');
   wherein each of the first and second integrated device (IC1, IC2) is configured for determining an angular position (α1, α2) of the single movable target.

10. The inductive angle sensor according to claim 9, wherein the first integrated device (IC1) is configured for determining a first angular value (α1) of the single movable target; and
   wherein the second integrated device (IC2) is configured for determining a second angular value (α2) of the single movable target; and
   wherein the inductive angle sensor is further configured for determining a consistency between the first angular value (α1) and the second angular value (α2).

11. The inductive angle sensor according to claim 1, comprising a first movable target (412a') having a first periodicity, and a second movable target (412b') having a second periodicity different from the first periodicity; and
   wherein the first set of receiver coils has a periodicity equal to the first periodicity, and wherein the second set of receiver coils has a periodicity equal to the second periodicity; and
   wherein the first integrated device (IC1) is configured for determining a first angular position (α1) of the first movable target relative to the first set of receiver coils; and
   wherein the second integrated device (IC2) is configured for determining a second angular position (α2) of the second movable target relative to the second set of receiver coils; and
   wherein the inductive angle sensor is further configured for determining an absolute angular position based on the first angular value (α1) and the second angular value (α2).

12. A torque sensor (400a) comprising:
   a torsion bar (441);
   an inductive angle sensor according to claim 1, comprising a first movable target (412a) and a second movable target (412b);
   wherein the first movable target (412a) is connected to the torsion bar (441) at a first axial position, and the second movable target (412b) is connected to the torsion bar (441) at a second axial position, spaced from the first axial position.

13. The torque sensor according to claim 12, wherein the first integrated device (IC1) is configured for determining a first angular position (α1) of the first movable target relative to the first set of receiver coils (RX1a, RX1b, RX1c); and
   wherein the second integrated device (IC2) is configured for determining a second angular position (α2) of the second movable target relative to the second set of receiver coils (RX2a, RX2b, RX2c); and
   wherein the torque sensor is further configured for determining a difference between the first angular value (α1) and the second angular value (α2), and for providing this difference, or a value derived therefrom, as a value indicative of the torque to be measured.

14. An inductive angle sensor comprising:
   a number N of inductively coupled transmitter coils (TX1, TX2, TX3, TX4) together forming an inductively coupled transmitter coil system, N being at least three;
   a plurality of receiver coil sets, each set of receiver coils comprising at least two or at least three receiver coils;
   a number N of integrated devices (IC1, IC2, IC3, IC4), each integrated device having a first and a second oscillator pin (LCP1, LCN1; LCP2, LCN2; LCP3, LCN3; LCP4, LCN4), and each integrated device having an excitation circuit for providing an alternating signal over its oscillator pins, and each integrated device having an evaluation circuit for evaluating signals obtained from one of the sets of receiver coils;
   at least one movable target (112; 312; 412a, 412b) for providing an inductive coupling between the inductively coupled transmitter coil system and the sets of receiver coils;
   wherein each transmitter coil (TX1, TX2, TX3, TX4) has a first end (TX1a, TX2a, TX3a, TX4a) operatively connected to a first oscillator pin (LCP1, LCP2, LCP3, LCP4) of a first integrated device (IC1, IC2, IC3, IC4), and has a second end (TX1b, TX2b, TX3b, TX4b) operatively connected to a second oscillator pin (LCN2, LCN3, LCN4, LCN1) of a subsequent integrated device (IC2, IC3, IC4, IC1).

15. The inductive angle sensor according to claim 14, further comprising one or both of:
   i) a number N of first electrical resistors (R1p, R2p, R3p, R4p) having a first end connected to a first oscillator pin (LCP1, LCP2, LCP3, LCP4) of a first integrated device (IC1, IC2, IC3, IC4) and having a second end connected to the first oscillator pin (LCP2, LCP3, LCP4, LCP1) of a subsequent integrated device (IC2, IC3, IC4, IC1);
   ii) a number N of second electrical resistors (R1n, R2n, R3n, R4n) having a first end connected to a second oscillator pin (LCN1, LCN2, LCN3, LCN4) of a first integrated device (IC1, IC2, IC3, IC4) and having a second end connected to the second oscillator pin (LCN4, LCN1, LCN2, LCN3) of a previous integrated device (IC4, IC1, IC2, IC3).

* * * * *